US009733097B2

(12) United States Patent
Sisbot et al.

(10) Patent No.: US 9,733,097 B2
(45) Date of Patent: Aug. 15, 2017

(54) CLASSIFYING ROUTES OF TRAVEL

(71) Applicants: TOYOTA JIDOSHA KABUSHIKI KAISHA, Toyota-shi, Aichi-ken (JP); DENSO CORPORATION, Kariya-shi, Aichi-ken (JP)

(72) Inventors: Emrah Akin Sisbot, Mountain View, CA (US); Veera Ganesh Yalla, Sunnyvale, CA (US); Eric Martinson, Mountain View, CA (US); Hirokazu Nomoto, Aichi-ken (JP); Takuya Hasegawa, Kariya (JP)

( * ) Notice: Subject to any disclaimer, the term of this patent is extended or adjusted under 35 U.S.C. 154(b) by 0 days.

(21) Appl. No.: 14/530,290

(22) Filed: Oct. 31, 2014

(65) Prior Publication Data

US 2016/0123743 A1     May 5, 2016

(51) Int. Cl.
| | |
|---|---|
| G01C 21/00 | (2006.01) |
| G06K 9/00 | (2006.01) |
| G06K 9/62 | (2006.01) |
| G06K 9/46 | (2006.01) |
| G01C 21/34 | (2006.01) |
| G06F 17/30 | (2006.01) |

(52) U.S. Cl.
CPC ..... *G01C 21/3461* (2013.01); *G01C 21/3453* (2013.01); *G06F 17/30268* (2013.01); *G06K 9/00302* (2013.01); *G06K 9/00711* (2013.01); *G06K 9/6267* (2013.01)

(58) Field of Classification Search
None
See application file for complete search history.

(56) References Cited

U.S. PATENT DOCUMENTS

| | | | | |
|---|---|---|---|---|
| 7,272,498 B2* | 9/2007 | Singh | ............................. | 701/431 |
| 7,653,485 B2* | 1/2010 | Fujita et al. | ................... | 701/411 |
| 8,352,179 B2* | 1/2013 | French et al. | ................ | 701/410 |
| 9,268,876 B2* | 2/2016 | MacInnis | ............... | A61B 5/002 |
| 2008/0294337 A1* | 11/2008 | Dawson | .................. | G01C 21/26 |
| | | | | 701/533 |
| 2010/0121566 A1* | 5/2010 | Joshi et al. | .................... | 701/202 |
| 2011/0016102 A1* | 1/2011 | Hawthorne | ........ | G06F 17/30032 |
| | | | | 707/706 |
| 2013/0006521 A1* | 1/2013 | Needham | ............. | G01C 21/343 |
| | | | | 701/426 |
| 2013/0080055 A1* | 3/2013 | Speier | .................... | G01C 21/00 |
| | | | | 701/533 |
| 2013/0166208 A1* | 6/2013 | Forstall | .............. | G01C 21/3453 |
| | | | | 701/538 |
| 2015/0051826 A1* | 2/2015 | Basson | .............. | G01C 21/3697 |
| | | | | 701/437 |

(Continued)

FOREIGN PATENT DOCUMENTS

| | | |
|---|---|---|
| JP | 2005077299 A | 3/2005 |
| JP | 2007205765 A | 8/2007 |

*Primary Examiner* — Thomas G Black
*Assistant Examiner* — Demetra Smith-Stewart
(74) *Attorney, Agent, or Firm* — Burbage Law, P.C.; Jon-Michael Burgbage; Elizabeth Ruzich

(57) ABSTRACT

The disclosure includes a method that includes assigning a classification to a travel route followed by a first client device based on data associated with when the first client device followed the travel route. The method may further include recommending the travel route to a second client device based on a request from the second client device for a desired travel route with the classification.

29 Claims, 9 Drawing Sheets

(56) References Cited

U.S. PATENT DOCUMENTS

2015/0260531 A1\* 9/2015 Ehsani .............. G01C 21/3484
   701/538
2015/0306457 A1\* 10/2015 Crankson ........... A63B 24/0021
   700/91
2016/0089954 A1\* 3/2016 Rojas Villanueva ......................
   G01C 21/3484
   701/36

\* cited by examiner

CLASSIFYING ROUTES OF TRAVEL

BACKGROUND

The specification relates to tagging a travel route based on a classification of the travel route.

Routes of travel, e.g., roads, may include locations with varying scenes. For example, some scenes along a route of travel may include ocean views, mountain views, or other scenic views. Furthermore, some routes of travel may have locations that include stressful travel conditions. For example, stressful travel conditions for a road may include a turn, a series of turns, an obstacle, a construction area, reduced visibility, ice on the road, a narrow area, reduced lane numbers, etc.

SUMMARY

According to one innovative aspect of the subject matter described in this disclosure, a system includes one or more processors and a memory communicatively coupled to the one or more processors. The memory stores instructions that, when executed by the one or more processors, cause the system to assign a classification to a travel route followed by a first client device based on data associated with when the first client device followed the travel route. The instructions may further cause the system to recommend the travel route to a second client device based on a request from the second client device for a desired travel route with the classification In general, another innovative aspect of the subject matter described in this disclosure may be embodied in one or more methods that include assigning a classification to a travel route followed by a first client device based on data associated with when the first client device followed the travel route. The method may further include recommending the travel route to a second client device based on a request from the second client device for a desired travel route with the classification.

In general, another innovative aspect of the subject matter described in this disclosure may be embodied in one or more systems that include a first sensor mounted in a vehicle to record operator data describing an emotional state of an operator of the vehicle. The system may also include a second sensor mounted in the vehicle to record travel route data describing a scene of a travel route followed by the vehicle. The system may also include memory communicatively coupled to the first and second sensors. The memory may be configured to store the operator data and the travel route data. The memory may further store instructions that when executed by a processor cause the system to assign a classification to the route based on the operator data and the travel route data.

In general, another innovative aspect of the subject matter described in this disclosure may be embodied in computer program product that includes a non-transitory computer-usable medium. The computer-usable medium may include a computer-readable program that when executed on a computer causes the computer to perform acts. The acts may include receiving sensor data that includes travel route data of a first client device associated with a vehicle and operator data of an operator of the vehicle as the first client device follows a travel route. The acts may also include determining, based on the operator data, an emotional state of the operator while the operator follows the travel route. The acts may also include correlating, in time, the travel route data with the emotional state of the operator. The acts may further include assigning a classification to the travel route based on correlation of the travel route data and the emotional state of the operator.

Other aspects include corresponding methods, systems, apparatus, and computer program products for these and other innovative aspects.

The disclosure is particularly advantageous in a number of respects. For example, the systems and methods described herein may be used to classify travel routes followed by a first client device. The classified travel routes of the first client device and other client devices may be stored and recommended to the first client device and other client devices based on requests from the first and other client devices.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

System Overview

A system for classifying a travel route is described. The system may collect data about travel routes. For example, the system may collect data that includes images of scenes along the travel route, an indication of an emotional state of a person traveling along the travel route, weather along the travel route, among other data. Based on the collected data, the system may tag the travel route. The tag of the travel route may indicate a classification of the travel route. Based on the tag of the travel route, the system may recommend the travel route based on requests from other systems.

In some implementations, the system may receive scene images along a route of travel from imaging sensors mounted in a vehicle. The scene images may be aggregated with metadata associated with the scene. For example, the metadata may include data that may describe a scene location, weather conditions at the scene location, a time the scene image is captured, a driving speed of the vehicle, a temperature at the scene location, among other data. The system may also capture operator data of an operator of the vehicle. The operator data may include an image of a face of the operator, heart rate of the operator, respiration of the operation, etc. Based on the operator data, the system may determine an emotional state, e.g., a mood, of the operator.

Using the scene images, the metadata, and the operator data, the system may tag with the travel route. The tag may indicate a classification of the travel route based on a user's attitude toward the travel route. For example, the tag may indicate that the travel route may be a leisure route with scenes of beaches. The system may wirelessly transmit the tagged travel route to a server via a wireless network.

The system may aggregate travel routes tagged by different vehicles. Other vehicles may request travel routes from the system with certain classifications. The system may recommend a travel route from the aggregated tagged travel routes to the other vehicles based on the requested travel route classification.

The preceding paragraphs are not intended to be limiting, but are illustrative of example benefits of the system and methods described by this disclosure according to some implementations. The system will now be described in more detail according to some implementations.

Figure 1:
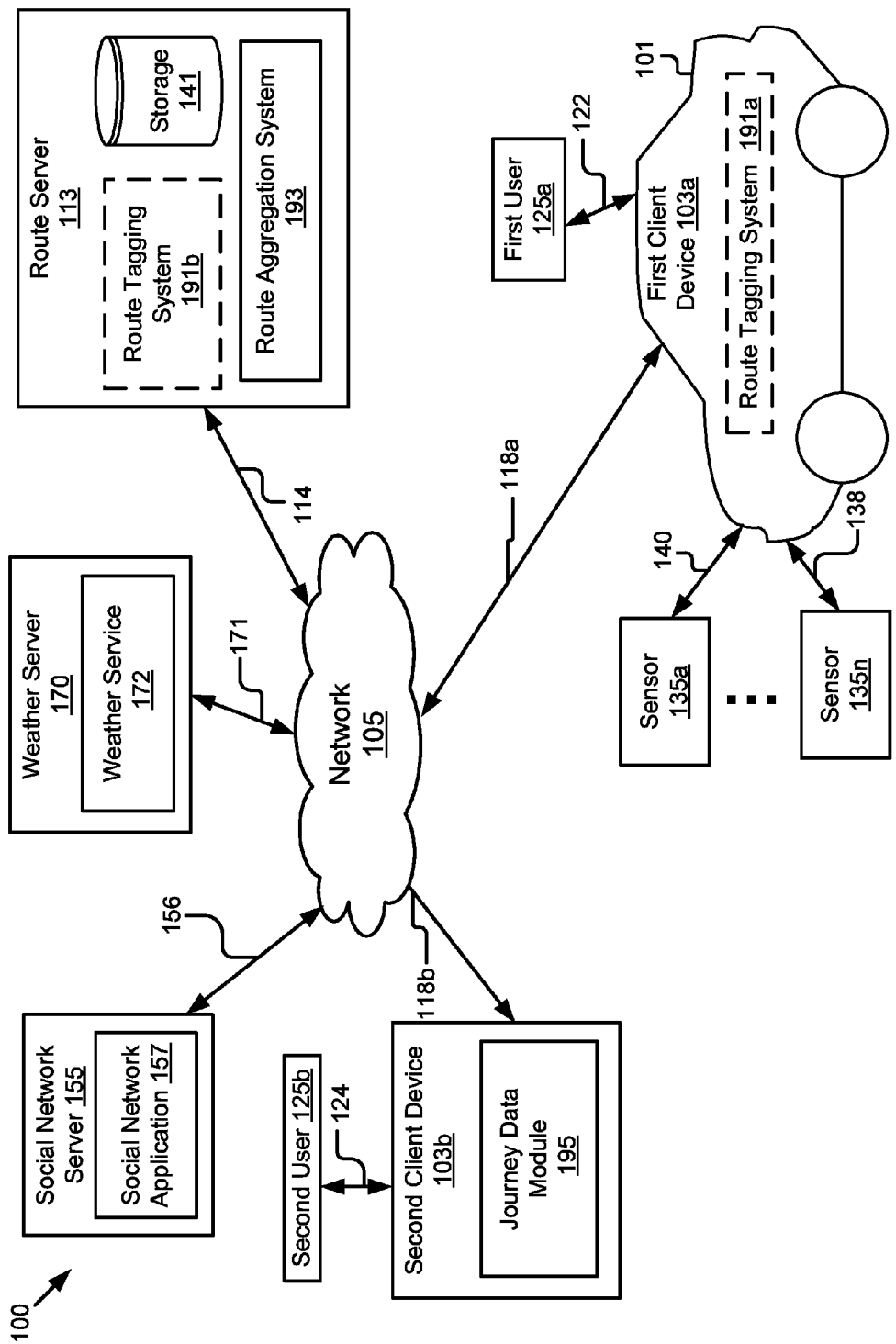
FIG. 1 is a block diagram illustrating an example system for classifying a travel route.

FIG. 1 is a block diagram illustrating an example system for classifying a travel route. Travel routes may be classified based on scenes along the travel routes, an indication of an emotional state of people traveling along the travel routes, among other data. For example, a travel route may be classified as an easy-driving route, a pleasant beachfront route, a pleasant driving route, a mountains route, a vista filled route, a hard-driving route, a stressful route, etc.

In the illustrated implementation, the system 100 may include a first client device 103a, a second client device 103b, a social network server 155, a weather server 170, and a route server 113. In the illustrated implementation, two or more of these entities may be communicatively coupled by a network 105. The system 100 may include other servers or devices not shown in FIG. 1 including, for example, a traffic server for providing traffic data and a map server for providing map data, etc. The first client device 103a may be accessed by a first user 125a via a signal line 122 and the second client device 103b may be accessed by a second user 125b via a signal line 124.

The first client device 103a and the second client device 103b in FIG. 1 are illustrated by way of example. While FIG. 1 illustrates two client devices 103, the disclosure applies to a system architecture having different numbers of client devices 103. Furthermore, although FIG. 1 illustrates one network 105 coupled to the client devices 103, the social network server 155, the weather server 170, and the route server 113, in practice one or more networks may be connected to any two or more of these entities. Additionally, while FIG. 1 depicts the system 100 as including one social network server 155, one weather server 170, and one route server 113, the system 100 may include any number of social network servers 155, weather servers 170, and route servers 113.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some implementations, the network 105 may include a peer-to-peer network. The network 105 may also be coupled to or may include portions of a telecommunications network for sending data in a variety of different communication protocols. In some implementations, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, etc. In some implementations, the network 105 may include a global positioning system (GPS) satellite or multiple GPS satellites for providing GPS navigation to the client devices 103. The network 105 may also include a mobile data network that may include third-generation (3G), fourth-generation (4G), long-term evolution (LTE), Voice-over-LTE ("VoLTE") or any other mobile data network or combination of mobile data networks. Further, the network 105 may include one or more IEEE 802.11 wireless networks.

The client devices 103 may each be a hardware device that includes a processor, a memory, and network communication capabilities. In the illustrated implementation, the first client device 103a and the second client device 103b are coupled to the network 105 via signal lines 118a and 118b, respectively. The client devices 103 may send or receive data to or from other entities of the system 100 via the network 105. The client devices 103 may include a vehicle (e.g., an automobile, a bus), a bionic implant, a wearable device, a laptop computer, a tablet computer, a mobile telephone, a personal digital assistant (PDA), a mobile e-mail device, a portable game player, a portable music player, or another electronic device.

The weather server 170 may be a hardware device that includes a processor, a memory, and network communication capabilities. In the illustrated implementation, the weather server 170 may be coupled to the network 105 via a signal line 171. The weather server 170 may send and receive data to and from other entities of the system 100 via the network 105. For example, the weather server 170 may send weather data to other entities of the system 100 via the network 105

The weather server 170 may include a weather service 172. The weather service 172 may be configured to track, record, and/or communicate weather data corresponding to one or more locations. The weather data may include information regarding temperature, amount of precipitation, humidity, presence of fog, presence of snow, presence of rain, presence of sleet, presence of hail, presence of sun, wind conditions, sunrise, sunset, etc. As detailed below, in some implementations, the weather data may be associated with a scene or one or more scenes along a travel route and/or with an indication of an emotional state of a person traveling along the route. As such, a correlation between weather conditions and a scene and/or the indication of an emotional state of the person may be determined. For example, a mountain scene along a travel route may be enjoyed more by a person in the winter when there is snow than in the summer. As another example, a beachside scene along a travel route may be enjoyed more by a person when the sun is shining than when it is raining.

The social network server 155 may be a hardware server that includes a processor, a memory, and network communication capabilities. In the illustrated implementation, the social network server 155 is coupled to the network 105 via a signal line 156. The social network server 155 sends and receives data to and from other entities of the system 100 via the network 105. The social network server 155 includes a social network application 157. A social network may be a type of social structure where users may be connected by a common feature or features. Each of the common features may include relationships/connections, e.g., friendship, family, work, an interest, etc. The common features may be provided by one or more social networking systems including explicitly defined relationships and relationships implied by social connections with other online users, where the relationships form a social graph. In some examples, the social graph may reflect a mapping of these users and how they may be related.

The social network server 155 and the social network application 157 may be representative of one social network and there may be multiple social networks coupled to the network 105, each having its own server, application, and social graph. For example, a first social network may be more directed to business networking, a second may be more directed to or centered on academics, a third may be more directed to local business, a fourth may be directed to dating, and others may be of general interest or a specific focus. In some implementations, a user of the social network associated with the social network server 155 (e.g., the first user 125a or the second user 125b) may provide images or other information about scenes along a travel route experienced by the user.

The route server 113 may be a hardware device that includes a processor, a memory, and network communication capabilities. In the illustrated implementation, the route server 113 is coupled to the network 105 via a signal line 114. The route server 113 may send and receive data to and from other entities of the system 100 via the network 105. For example, the route server 113 may send or receive travel routes to or from the client devices 103 via the network 105.

In the illustrated example, the first client device 103a may include a route tagging system 191a and the route server 113 may include a route tagging system 191b. In the present disclosure, the route tagging systems 191 are described as being configured to perform various operations. Depending on the implementation, the route tagging system 191b associated with the route server 113 may be configured to perform all the corresponding operations and/or the route tagging system 191a associated with the first client device 103a may be configured to perform all the corresponding operations. Further, depending on the implementation, the route tagging system 191b may be configured to perform some of the operations that the route tagging system 191a may not be configured to perform, or vice versa. Further, in some implementations, the first client device 103a may include the route tagging system 191a and the route server 113 may not include the route tagging system 191b, or vice versa. As such, the route tagging systems 191a and 191b are depicted with dashed lines to indicate that the route tagging system 191 may be in various locations. Additionally, referral to the "route tagging system 191" and its associated operations may refer to an individual route tagging system 191 (e.g., the route tagging system 191a or the route tagging system 191b, individually) or may refer to the route tagging systems 191a and 191b collectively.

As detailed below, the route tagging system 191 may be configured to tag scenes along a travel route or the travel route of the first client device 103a based on a classification assigned to the scene along the travel route or the travel route based on data from one or more sensors 135 (illustrated as sensors 135a through 135n in FIG. 1). The data that may be generated by the sensors 135 may be referred to as "sensor data." In some implementations, the first client device 103a may be communicatively coupled to the sensors 135 via one or more signal lines. For example, the first client device 103a may be communicatively coupled to the sensor 135a via a signal line 140 and the first client device 103a may be communicatively coupled to the sensor 135n via a signal line 138.

In some implementations, the first client device 103a may be configured to receive the sensor data from the sensors 135 and may be configured to relay the sensor data to the route tagging system 191. For example, the first client device 103a may be configured to relay the sensor data to the route tagging system 191b of the route server 113 via the network 105, and/or to the route tagging system 191a of the first client device 103a via a bus of the first client device 103a.

One or more of the sensors 135 may be integrated with the first client device 103a or may be separate from the first client device 103a. The sensors 135 may include any suitable systems, apparatus, or device configured to generate sensor data that may be used to classify a travel route. For example, the sensors 135 may include one or more cameras configured to images scenes along the travel route that may be used to classify the travel route. Association of a particular client device 103 with a particular vehicle (e.g., associated of the first client device 103a with the vehicle 101) may include integration of the particular client device 103 with the particular vehicle and/or may include the particular client device 103 being a device separate from the particular vehicle but that may be transported inside of the particular vehicle. In these and other implementations, when the particular client device 103 is integrated with the particular vehicle, the sensors 135 may be integrated with the particular vehicle. When the particular client device 103 is separate from the particular vehicle, the sensors 135 may be part of the particular vehicle and/or part of the client device 103. Furthermore, reference to a journey, journey data, a travel route, a location of, or the like of a particular client device 103 may also refer to the journey, journey data, travel route, location of, or the like of a particular vehicle with which the particular client device 103 may be associated.

Additionally, one or more of the sensors 135 may include any suitable system, apparatus, or device that may be configured to collect operator data of an operator of the vehicle 101. "Operator data" as used herein may be sensor data that indicates an emotional state of the operator. The operator data that indicates an emotional state of the operator may be used to help classify a travel route followed by the operator of the vehicle 101. For example, the operator data may be used to estimate an attitude of an operator toward a scene and thus a travel route that includes the scene. For example, a beachfront scene may cause the operator to be happy, content, or glad. As a result, the beachfront scene may be classified as a pleasant beachfront scene. As another example, a twisting driving route may cause the operator to be focused, anxious, and/or nervous. As a result, the twisting driving route may be classified as a dangerous driving route.

In these or other implementations, the sensors 135 may include a camera sensor configured to capture images of a face of the operator. A face of the operator may illustrate an emotional state of the operator. For example, the camera may be configured to monitor eye gaze, pupil dilation or other optical conditions of the operator. A change in the pupil dilation may indicate concentration by the operator.

Alternately or additionally, the sensors 135 may be sensors configured to collect other biological metrics of the operator of the vehicle 101. For example, in some implementations, the sensors 135 may include a blood pressure monitor that may be configured to monitor the blood pressure of the operator. Alternately or additionally, the sensors 135 may include a respirator monitor that may be configured to monitor the respiration of the operator. Alternately or additionally, the sensors 135 may include a temperature monitor that may be configured to monitor the temperature of the operator. Alternately or additionally, the sensors 135 may include a heart rate monitor that may be configured to monitor the heart rate of the operator. The biological metrics of the operator collected by the sensors 135 may indicate an emotion state of the operator. For example, when the operator is content or relaxed, the respiration, the blood pressure, and/or the temperature of the operator may be on low end of normal for the operator. When the operator is agitated or stressed, the respiration, the blood pressure, and/or the temperature of the operator may be on high end of normal for the operator. The emotional state of the operator may be used to estimate an attitude of the operator towards a scene or a travel route. The attitude of the operator may be used to classify the scene or travel route.

The route tagging system 191 may be configured to classify travel routes based on the sensor data and to tag the travel routes based on their classification. For example, the route tagging system 191 may receive sensor data that includes an image of a scene along a travel route. Additional metadata regarding the image may also be provided to the route tagging system 191. The route tagging system 191 may analysis the image and the metadata to classify the scene captured in the image. The route tagging system 191 may classify the scene according to the type of scene that is displayed. For example, the route tagging system 191 may classify a scene based on the geography of the scene, e.g., a beach, mountain, plain, city, canyon, trees, nature, housing, wilderness, etc. The route tagging system 191 may also classify a scene based on the conditions of the scene. For example, the route tagging system 191 may receive information about the weather at the scene from the weather server 170. Alternately or additionally, the route tagging system 191 may classify a scene based on temperature data from one of the sensors 135.

The route tagging system 191 may further classify a scene based on an attitude of a person associated with the first client device 103*a*. The attitude of the person may be estimated based on an indication of an emotional state of a person associated with the first client device 103*a*. For example, the person may be an operator of the vehicle 101 that includes the first client device 103*a*. In this and other implementations, the route tagging system 191 may receive operator data from the sensors of biological metrics of the operator. Using the biological metrics, the route tagging system 191 may determine an indication of the emotional state of the operator. The route tagging system 191 may correlate, in time, the emotional state of the operator with sensor data about the scene to estimate an attitude of the person. The attitude of the person may be used to further classify the travel route. For example, the scene may indicate a beachfront view. As the scene of the beachfront view is captured, the emotional state of the operator may be anxious, and other sensor data may indicate that the vehicle 101 may be continually turning. The route tagging system 191 may correlate the scene, the emotional state, and the other sensor data to classify the scene as a risky beachfront travel route.

In some implementations, the route tagging system 191 may classify a scene based on information other than the sensor data from the sensors 135. For example, the route tagging system 191 may receive social data from the social network application 157 regarding the scene. For example, the route tagging system 191 may receive social updates from a social media account of the operator of the vehicle 101 about a scene along the travel route of the vehicle 101. The route tagging system 191 may use the social updates along with the sensor data from the sensors 135 to classify the scene.

Using the classification of one or more scenes along the travel route, the route tagging system may be configured to classify the travel route. For example, assume that a travel route included five different scenes. One of the scenes indicated a beachfront view and the other four scenes indicated a city view. In these and other implementations, the travel route may be classified and tagged as a city travel route. Alternately or additionally, the travel route may be classified as a city travel route with a beachfront portion. In some implementations, the travel route may be tagged as a city travel route with a beachfront portion and the scene of the travel route that is a beachfront portion and the scenes of the travel route with the city view portions may be indicated in the tag.

In some implementations, the route tagging system 191 may request that the operator of the vehicle 101 confirm the classification of the scene and/or travel route. Alternately or additionally, the route tagging system 191 may request that the operator of the vehicle 101 confirm the emotional state of the operator and/or an attitude of the operator toward the scene and/or travel route.

The route tagging system 191 may be configured to communicate the tagged travel routes to storage 141 of the route server 113. For example, the route tagging system 191*a* may be configured to communicate the tagged travel routes to the route server 113 via the network 105 and the route server 113 may be configured to store the received tagged travel routes on the storage 141. In these or other implementations, the route tagging system 191*b* may be configured to communicate the problematic locations to the storage 141 via a bus of the route server 113. Alternately or additionally, the route tagging system 191*a* may be configured to communicate the tagged travel routes to the social network application 157 to be shared with those associated with the first client device 103*a* on the social network.

The storage 141 may be a non-transitory storage medium that stores data for providing the functionality described herein. The storage 141 may be a dynamic random access memory (DRAM) device, a static random access memory (SRAM) device, flash memory, or some other memory devices. In some implementations, the storage 141 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some implementations, the route server 113 may include a route aggregation system 193. The route aggregation system 193 may be configured to receive data regarding multiple tagged travel routes. The data regarding the multiple tagged travel routes may be received from any number of client devices 103. For example, although the above discussion regarding the classification of tagged travel routes is given with respect to travel routes that may be encountered by the first client device 103*a*, any number of other client devices 103 (e.g., the second client device 103*b*) and their associated vehicles may also classify their travel routes. Further, associated route tagging systems 191 (e.g., of the different client devices 103 and/or the route tagging system 191*b* of the route server 113) may determine and tag the corresponding travel routes. Therefore, multiple tagged travel routes traversed by multiple client devices and their associated vehicles may be communicated to the route aggregation system 193.

The route aggregation system 193 may aggregate similar or analogously tagged travel routes. Alternately or additionally, the route aggregation system 193 may aggregate similar travel routes and based on a majority or some other calculation, determine a classification for a travel route based on the assigned classifications for the travel routes received from the various route tagging systems 191. For example, assume that a travel route is tagged once as a risky beachfront view and the same travel route is tagged fifteen times as a pleasant beachfront view. In these and other implementations, the route aggregation system 193 may determine that the travel route is a pleasant beachfront view and may discard the non-conforming tag. Alternately or additionally, the route aggregation system 193 may determine a difference between the sensor data that resulted in the travel route being tagged as a risky beachfront view instead of the pleasant beachfront view. The route aggregation system 193 may make an indication that the travel route may be risky or pleasant based on various conditions indicated by the sensor data. For example, when it is sunny the travel route may be pleasant, but during a storm the travel route may be risky.

The second client device 103*b* may include a journey data module 195. The journey data module 195 may be configured to request a travel route for the second client device 103*b* from the route server 113. In particular, the journey data module 195 may indicate a starting location and a destination location along with a desired travel route classification for traveling from the starting location to the destination location. The journey data module 195 may transmit the starting location, the destination location, and the desired travel route classification to the route server 113 over the network 105. The route server 113 may provide the starting location, the destination location, and the desired travel route classification to the route aggregation system 193. The route aggregation system 193 may recommend a travel route to the journey data module 195 based on the starting location, the destination location, and the desired travel route classification from the journey data module 195.

In some implementations, the route aggregation system 193 may generate a travel route using one or more scenes from multiple different tagged travel routes from multiple different route tagging systems 191. Alternately or additionally, the journey data module 195 may place additional requirements on the requested travel route. For example, the journey data module 195 may request travel routes that may be tagged in a similar or analogous manner by more than a certain number of different route tagging systems 191. Alternately or additionally, the journey data module 195 may request travel routes that have been tagged by other route tagging systems 191 associated with the second client device 103*b* through social media or some other association.

Modifications, additions, or omissions may be made to the system 100 without departing from the scope of the present disclosure. For example, the locations of the modules and systems described herein are merely used for illustrative purposes. For instance, although not explicitly illustrated, in some implementations, the second client device 103*b* may include the a route tagging system 191 and one or more sensors 135. In these or other implementations, the first client device 103*a* may include the journey data module 195.

Example Journey Data Module

Figure 2:
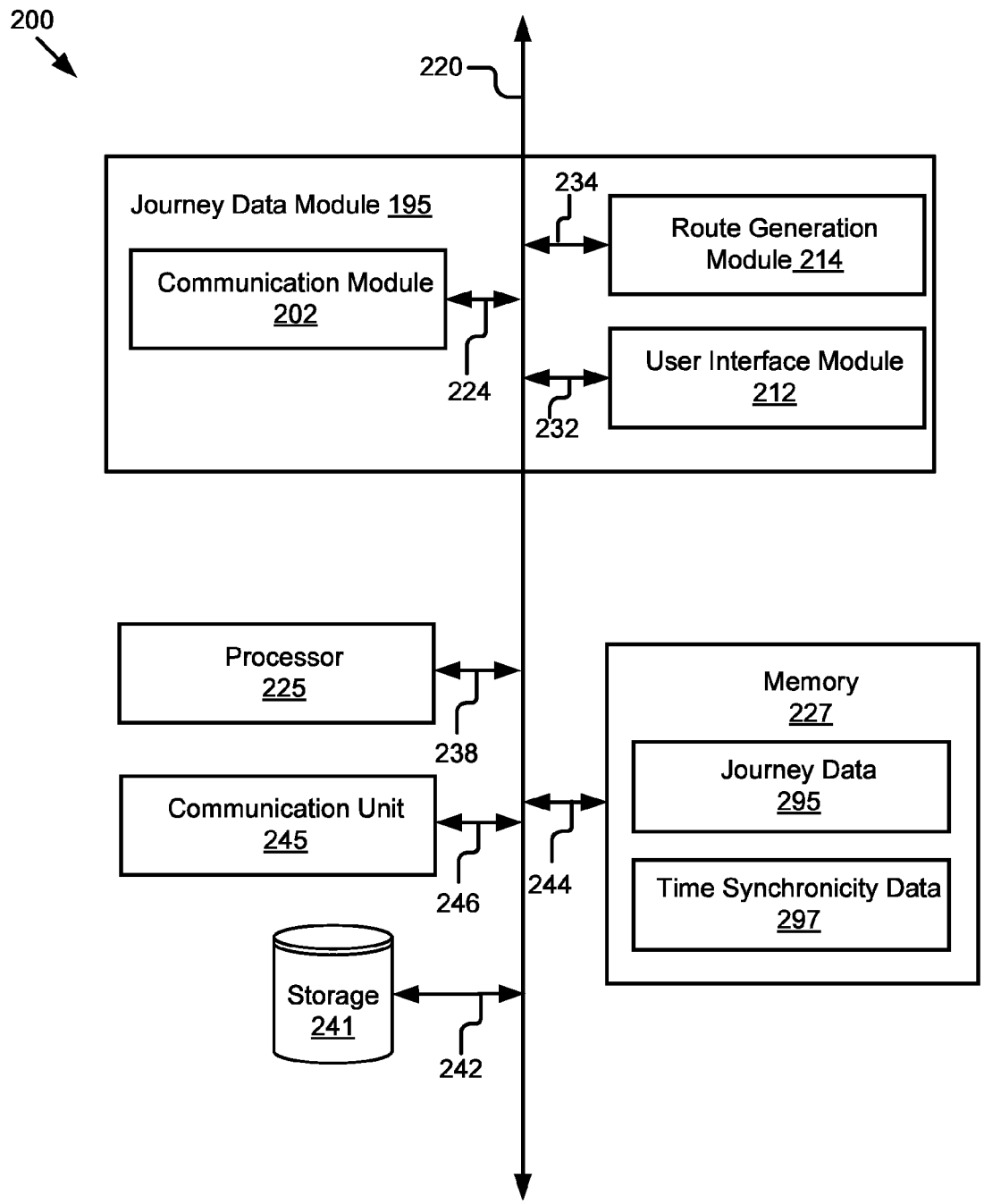
FIG. 2 is a block diagram illustrating an example computing device that includes an example journey data module.

FIG. 2 is a block diagram illustrating an example computing device 200 that includes an implementation of the journey data module 195 of FIG. 1. In some implementations, the computing device 200 may be included with the second client device 103*b* of FIG. 1. The computing device 200 includes the journey data module 195, a processor 225, a communication unit 245, a storage 241, and a memory 227 according to some examples. The components of the computing device 200 may be communicatively coupled by a bus 220. The bus 220 may include, but is not limited to, a controller area network (CAN) bus, a memory bus, a storage interface bus, a bus/interface controller, an interface bus, or the like or any combination thereof.

The processor 225 may include an arithmetic logic unit, a microprocessor, a general-purpose controller, or some other processor array configured to perform computations and provide electronic display signals to a display device. In the illustrated example, the processor 225 is coupled to the bus 220 for communication with the other components via a signal line 238. The processor 225 may process data signals and may include various computing architectures including a complex instruction set computer (CISC) architecture, a reduced instruction set computer (RISC) architecture, or an architecture implementing a combination of instruction sets. Although FIG. 2 includes a single processor 225, multiple processors 225 may be included. Other processors, operating systems, sensors, displays, and physical configurations may be possible.

The memory 227 may be configured to store instructions or data that may be executed by the processor 225. The memory 227 may be coupled to the bus 220 for communication with the other components via a signal line 244. The instructions or data may include code for performing the techniques described herein. The memory 227 may be a dynamic random access memory (DRAM) device, a static random access memory (SRAM) device, flash memory, or some other memory device. In some implementations, the memory 227 may include a non-volatile memory or similar permanent storage and media including a hard disk drive, a floppy disk drive, a CD-ROM device, a DVD-ROM device, a DVD-RAM device, a DVD-RW device, a flash memory device, or some other mass storage for storing information on a more permanent basis.

As illustrated in FIG. 2, the memory 227 may store journey data 295. The journey data 295 may include data indicating a current starting location and destination locations of the corresponding client device. The journey data 295 may further include information about desired characteristics for a current travel route between the current starting and destination locations. For example, the journey data 295 may indicate that a desired characteristic for the current travel route is that the current travel route by a pleasant drive with wilderness scenery. Further, in these or other implementations, the journey data 295 may include weather data that may also correspond to the current travel routes. The journey data 295 may further include various travel routes and/or scenes from one or more travel routes that are received from a route aggregation system, such as the route aggregation system 193 of FIG. 1. The journey data 295 may further include a current travel route between the current starting and destination locations. Alternately or additionally, the journey data 295 may include multiple travel routes between the starting and destination locations.

In some implementations, the memory 227 may also store time synchronicity data 297. The time synchronicity data 297 may include information describing a universal time shared among one or more systems associated with the network 105 of FIG. 1. The time synchronicity data 297 may be data used to synchronize a system time with a universal time. For example, the time synchronicity data 297 may be configured to synchronize a local time associated with a client device 103 with a universal time.

The communication unit 245 may be configured to transmit and receive data to and from any other entities of the system 100 of FIG. 1. The communication unit 245 is coupled to the bus 220 via a signal line 246. In some implementations, the communication unit 245 includes a port for direct physical connection to the network 105 of FIG. 1 or to another communication channel. For example, the communication unit 245 may include a universal serial bus (USB) port, a secure digital (SD) port, a category 5 cable (CAT-5) port, or similar port for wired communication with another device. In some implementations, the communication unit 245 includes a wireless transceiver for exchanging data with any suitable entity of the system 100 of FIG. 1 or other communication channels using one or more wireless communication methods, including IEEE 802.11, IEEE 802.16, BLUETOOTH®, or another suitable wireless communication method.

In some implementations, the communication unit 245 includes a cellular communications transceiver for sending and receiving data over a cellular communications network including via SMS, MMS, HTTP, direct data connection, WAP, e-mail, or another suitable type of electronic communication. In some implementations, the communication unit 245 includes a wired port and a wireless transceiver. The communication unit 245 also provides other conventional connections to the network 105 of FIG. 1 for distribution of files or media objects using standard network protocols including transmission control protocol/internet protocol (TCP/IP), HTTP, HTTP secure (HTTPS), and simple mail transfer protocol (SMTP), dedicated short range communication (DSRC) for vehicle-to-vehicle transmission of digital data, etc.

The storage 241 may be a non-transitory storage medium that stores data for providing the functionality described herein. The storage 241 may be a dynamic random access memory (DRAM) device, a static random access memory (SRAM) device, flash memory, or some other memory devices. In some implementations, the storage 241 also includes a non-volatile memory or similar permanent storage and media including a hard disk drive, a floppy disk drive, a CD-ROM device, a DVD-ROM device, a DVD-RAM device, a DVD-RW device, a flash memory device, or some other mass storage for storing information on a more permanent basis. The storage 241 is communicatively coupled to the bus 220 via a signal line 242. The storage 241 may also store data that was temporarily stored in the memory 227.

In the illustrated implementation of FIG. 2, the journey data module 195 includes a communication module 202, a user interface module 212, and a route generation module 214. The components of the journey data module 195 are communicatively coupled to the bus 220. For example, the communication module 202 may be communicatively coupled to the bus 220 via a signal line 224, the user interface module 212 may be communicatively coupled to the bus 220 via a signal line 232, and the route generation module 214 may be communicatively coupled to the bus 220 via a signal line 234

The communication module 202 may include software including routines for handling communications between the journey data module 195 and other components of the computing device 200. The communication module 202 may also be configured to send and receive data, via the communication unit 245, to and from one or more entities of the system 100 of FIG. 1.

The user interface module 212 may include software that includes routines for generating graphical data for providing user interfaces. In some implementations, the user interface module 212 generates graphical data for providing a user interface that allows a user (e.g., the second user 125*b*) to input data via the user interface. For example, the user may input starting and destination locations via the user interface. Alternately or additionally, the user may input a desired or range of classifications for the travel route between the starting and destination locations. Alternately or additionally, the user may input a range of time and distances that may be used for the travel route between the starting and the destination locations.

The user interface module 212 may also be configured to send the graphical data to a display coupled to the computing device 200 for presenting the user interface to the user. In some implementations, the user interface module 212 may generate graphical data or audio data for presenting notifications to the user. For example, in some implementations, the user interface module 212 may generate a graphical and/or audio notification of a travel route. Alternately or additionally, the user interface module 212 may be configured to generate a graphical and/or audio notification about specific scenes on the travel route. For example, the user interface module 212 may alert a user of an upcoming scene and a location of the scene, e.g., the scene appearing on the left or right hand side of a vehicle of the user.

The journey data module 195 may include software that includes routines for generating the journey data 295, including performing the operations as described in herein. For example, in some implementations, the journey data module 195 may receive route details, including starting and destination locations, current weather data, a range of distances and times desired by the user, a classification of a desired travel route between the starting and destination locations, and characteristics of the classification of the desired travel route, e.g., a rating of the travel route, a number of tagged travel routes received before being used as the recommended travel route, etc., from the user interface module 212. In some implementations, the journey data module 195 may provide the route details to the communication module 202 to communicate the route details to the route server 113 of FIG. 1.

Alternately or additionally, the journey data module 195 may generate one or more travel routes based on the route details. For example, between a staring and destination location, the journey data module 195 may generate four different travel routes. The journey data module 195 may generate the different travel routes using any number of different mapping or routing software or routines. Alternately or additionally, the journey data module 195 may send a request over a network, such as the network 105 of FIG. 1, that another computing entity generate the different travel routes. The journey data module 195 may provide the travel routes to the communication module 202 to communicate the travel routes to the route server 113 of FIG. 1.

As detailed below, the route server 113 may be configured to recommend one or more travel routes to the journey data module 195 based on the route details. In these and other implementations, the journey data module 195 may provide the recommended one or more travel routes to the user interface module 212 for presenting to a user. The user interface module 212 may provide one of the recommended travel routes as selected by the user to the journey data module 195. The journey data module 195 in these and other implementations may navigation using the recommended travel route or may provide the recommended travel route to a navigation system through the communication module 202. In some implementations, the journey data module 195 may request an updated recommendation from the route server 113 based on changes in the weather, destination location, time, distance, and/or based on a request from a user through the user interface module 212.

Alternately or additionally, the route server 113 may be configured to one or more recommended travel routes and/or recommended one or more scenes from one or more travel routes to the journey data module 195 based on the route details. In these and other implementations, the journey data module 195 may provide the one or more scenes from the one or more travel routes to the route generation module 214.

The route generation module 214 may include software including routines for generating the journey data 295, including performing the operations as described in herein. The route generation module 214 may receive the one or more scenes and/or one or more travel routes and the classifications of the one or more scenes and/or the one or more travel routes from the route server 113. The route generation module 214 may be configured to generate a recommended travel route for a user based on the route data and the recommendations from the route server 113. For example, assume that the route server 113 provides various scenes in the area of a travel route between the staring and destination locations that includes the classification of the desired travel route. The route generation module 214 may be configured to generate a recommend travel route using the various scenes. In these and other implementations, the recommend travel route may be different from any tagged travel route in the route server 113, but may be a compilation of various scenes from multiple tagged travel routes in the route server 113. In these and other implementations, the route generation module 214 may generate the recommended travel route using one or more routines stored on other servers, such as mapping routines from mapping service available on the Internet.

In some implementations, the journey data module 195 may be stored in a single server or device. In some other implementations, the journey data module 195 may be distributed and stored across multiple servers or devices. Furthermore, the separation of various components, modules, and servers in the implementations described herein should not be understood as requiring such separation in all implementations. In some implementations, the described components, modules, devices, or servers may generally be integrated together in a single component, module, device, or server.

In some implementations, the modules 195, 202, 212, and 214 may be a set of instructions that may be executable by the processor 225. In these or other implementations, one or more of the modules 195, 202, 212, and 214 may be stored in the memory 227 and may be accessible and executable by the processor 225 of the computing device 200. One or more of the modules 195, 202, 212, and 214 may be adapted for cooperation and communication with the processor 225 and other components of the computing device 200. In some implementations, one or more of the modules 195, 202, 212, and 214 may be adapted to function as one or more thin clients that are stored and executed by a processor of the computing device 200.

Example Route Tagging System

Figure 3:
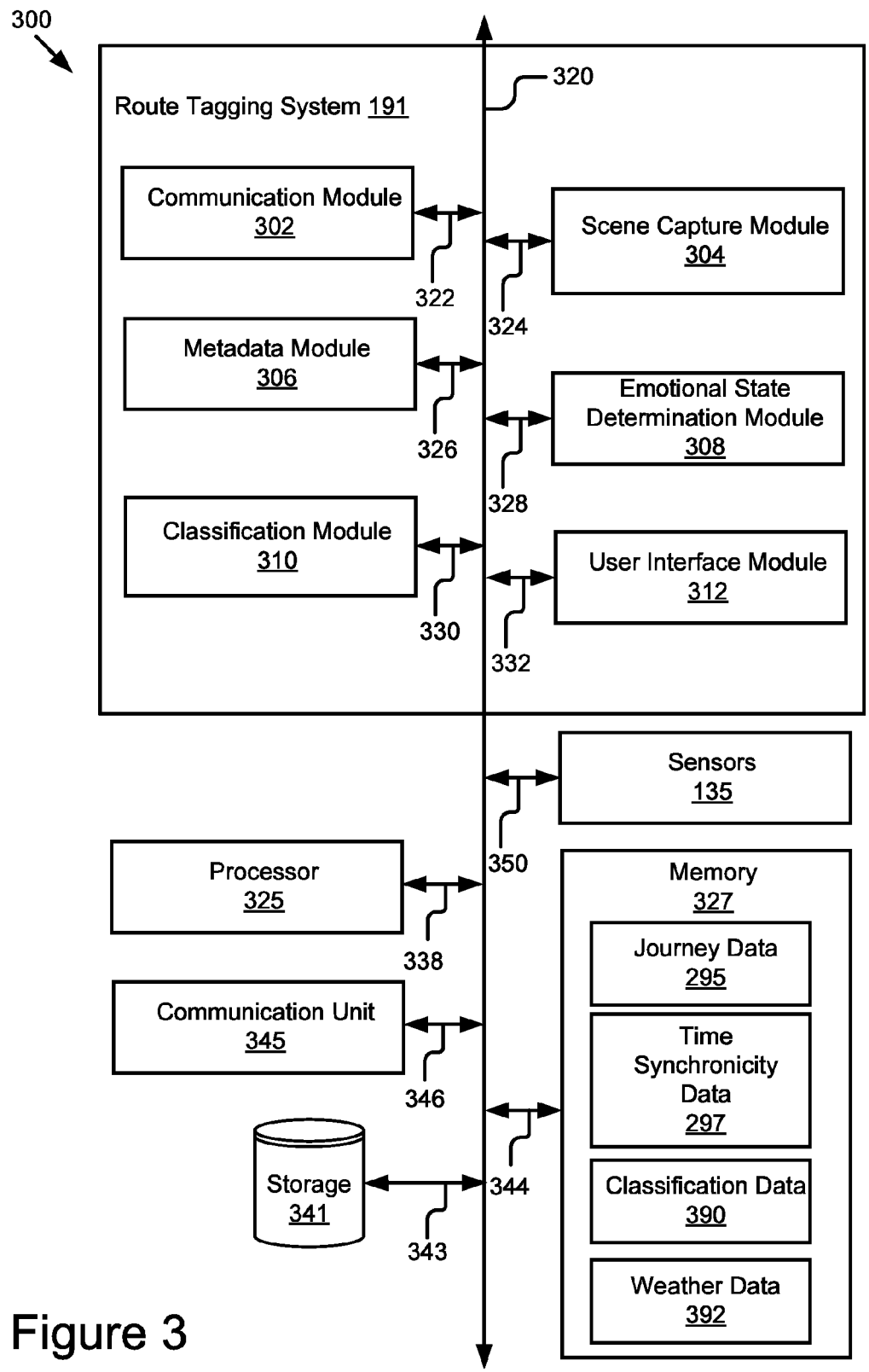
FIG. 3 is a block diagram illustrating an example computing device that includes an example route tagging system.

FIG. 3 is a block diagram illustrating an example computing device 300 that includes an implementation of the route tagging system 191 of FIG. 1. As illustrated in FIG. 1, in some implementations, the computing device 300 may be included with the first client device 103a and/or the route server 113 of FIG. 1. The computing device 300 includes the sensors 135, the route tagging system 191, a processor 325, a communication unit 345, a storage 341, and a memory 327 according to some examples. The components of the computing device 300 may be communicatively coupled by a bus 320.

The sensors 135 may be described with respect to FIG. 1 and may be coupled to the bus 320 for communication with other components via a signal line 350. The processor 325 may have a structure similar to the processor 225 and may provide functionality similar to the processor 225. The processor 325 may be coupled to the bus 320 for communication with other components via a signal line 338. The communication unit 345 may have a structure similar to the communication unit 245 and may provide functionality similar to the communication unit 245. The communication unit 345 may be coupled to the bus 320 for communication with other components via a signal line 346. The storage 341 may have a structure similar to the storage 241 and may provide functionality similar to the storage 241. The storage 341 may be coupled to the bus 320 for communication with other components via a signal line 343.

The memory 327 may have a structure similar to the memory 227 and may provide functionality similar to the memory 227. The memory 327 may be coupled to the bus 320 for communication with other components via a signal line 344. The memory 327 may also include the journey data 295 and the time synchronicity data 297 described with respect to FIG. 2. Further, the memory 327 may include classification data 390 and weather data 392 that may be associated with the classification data 390.

The classification data 390 may include classifications associated with one or more scenes along one or more travel routes. As described below, the classification data 390 may be determined by a classification module 310 of the route tagging system 191. The classification data 390 may further include operator data that may indicate an emotional state of an operator, images of scenes along a travel route, and/or travel route data that may include information about the images of the scenes along the travel route. In these or other implementations, correlation of the operator data at the corresponding time that the scene is imaged may be based on the time synchronicity data 297. For example, the time synchronicity data 297 may indicate that the scene is imaged at a particular time and date. Further, the operator data may be collected at the particular time and date (e.g., by the emotional module 308, as described below) and thereby associated with the image.

The weather data 392 may include weather conditions at a scene along a travel route. In some implementations, the weather data 392 may be received from the weather server 170 and the weather service 172. In some implementations, the weather data 392 may include the weather conditions at the scene at the time that the scene is imaged. In these or other implementations, correlation of the weather data 392 at the corresponding time that the scene is imaged may be based on the time synchronicity data 297. For example, the time synchronicity data 297 may indicate that the scene is imaged at a particular time and date. Further, one or more weather conditions at the scene at the particular time and date may be received (e.g., as requested by the metadata module 306, as described below) from the weather server 170 and the weather service 172 and may then be stored as particular weather data 392 that may be associated with the scene and/or the travel route. The weather data 392, the operator data, the images of scenes, the travel route data may be referred to herein as characterization data.

The weather data 392 may be used to determine whether weather conditions played a role in the classification of the scene or the travel route that includes the scene. For example, the weather data 392 associated with a scene may indict that different classifications of the scene and/or the travel route by different route tagging systems 191 may be weather related. In contrast, in other instances, the weather data 392 may indicate that the scene and/or the travel route received almost the same classification regardless of the weather. Therefore, it may be determined that weather played a role in determining the classification of the scene and/or the travel route.

In the illustrated implementation of FIG. 3, the route tagging system 191 includes a communication module 302, a metadata module 306, a classification module 310, a scene capture module 304, an emotional state determination module 308 (referred to herein as the "emotion module 308"), and a user interface module 312. The components of the route tagging system 191 may be communicatively coupled to the bus 320. For example, the communication module 302 may be communicatively coupled to the bus 320 via a signal line 322, the metadata module 306 may be communicatively coupled to the bus 320 via a signal line 326, the classification module 310 may be communicatively coupled to the bus 320 via a signal line 330, the scene capture module 304 may be communicatively coupled to the bus 320 via a signal line 324, the emotion module 308 may be communicatively coupled to the bus 320 via a signal line 328, and the user interface module 312 may be communicatively coupled to the bus 320 via a signal line 332.

The communication module 302 may include software including routines for handling communications between the route tagging system 191 and other components of the computing device 300. The communication module 302 may also be configured to send and receive data, via the communication unit 345, to and from one or more entities of the system 100 of FIG. 1. In some implementations, the communication module 302 receives data from one or more of the modules of the route tagging system 191 and stores the data in one or more of the storage 341 and the memory 327. In these or other implementations, the communication module 302 may be configured to retrieve data from the storage 341 or the memory 327 and to send the data to one or more of the modules of the route tagging system 191.

The scene capture module 304 may configured to direct one or more of the sensors 135 to capture images of one or more scenes surrounding the route tagging system 191. The images of the one or more scenes may be part of the travel route data discussed herein. For example, when the route tagging system 191 is part of vehicle, such as the vehicle 101 of FIG. 1, the scene capture module 304 may direct the sensors 135 to capture images on one or more sides of the car. The scene capture module 304 may be configured to recognize various types of scenes captured in the images from the sensors 135. For example, the scene capture module 304 may be configured to recognize beaches, mountains, plains, desert, tropical, trees, city, farm land, towns, homes, among other types of scenes that may be viewed from a vehicle. The scene capture module 304 may associate the image with a type of the imaged scene.

In some implementations, the scene capture module 304 may be configured to direct the capturing of multiple images along a travel route. In these and other implementations, the scene capture module 304 may capture images at set or varying time intervals along a travel route. In these and other implementations, the scene capture module 304 may retain all of the captured images. Alternately or additionally, the scene capture module 304 may capture images at set or varying distance intervals along a travel route. In these and other implementations, the scene capture module 304 may retain all of the captured images. Alternately or additionally, the scene capture module 304 may compare recently captured images to previously captured images that are captured at set or varying time and/or distance intervals. When the recently captured images are substantially the same as previously captured images, the scene capture module 304 may discard the recently captured images. In this manner, the scene capture module 304 may retain images of different scenes along the travel route without retaining images of duplicate scenes along the travel route. In this manner, the scene capture module 304 may retain an image of all or substantially all of the different scenes along a travel route while reducing a total number of images being retained.

In some implementations, the scene capture module 304 may retrieve one or more images of scenes along a travel route from a social media collection associated with the route tagging system 191. For example, the route tagging system 191 may be associated with a client device that is associated with a user. The user may capture images of a scene and provide the scene images to a social media collection. The scene capture module 304 may access the scene images from the social media collection.

The metadata module 306 may be configured to associate travel route data that is associated with the scenes captured by the images with the images of the scenes retained by the scene capture module 304. The travel route data associated with an image may be data that describes the scene when the image of the scene is captured and/or a manner of how the image of the scene is captured. For example, the metadata module 306 may associate a location of a scene with an image of the scene and a time that the image is captured. For example, the location of the scene may be determined based on global positioning system (GPS) coordinates. The metadata module 306 may also associate a temperature and/or other weather conditions of a scene with an image of the scene. In some implementations when the route tagging system 191 is associated with a vehicle, the metadata module 306 may associate the driving direction and driving speed of the vehicle when an image is taken with the image. The metadata module 306 may also associate a type of camera and lens used to capture an image with the image. The metadata module 306 may further associate weather data 392 with an image of a scene by using the time synchronicity data 297 as described above.

In some implementations when the route tagging system 191 is associated with a vehicle, the emotional module 308 may be configured to collect operator data from the sensors 135. In particular, the emotional module 308 may be configured to collect operator data from sensors 135 that are internal to the vehicle.

The operator data may include data associated with an operator of the vehicle. For example, the operator data may include an image of the operator. The image of the operator may be a facial image of the operator. In these and other implementations, using the image, eye gaze, pupil dilation or other optical conditions of the operator may be determined. Furthermore, facial expressions and other emotional aspects of the operator may be monitor. The operator data may further include biological metrics of the operator. The biological metrics of the operator may include blood pressure, respiration, temperature, heart rate, etc., of the operator.

The emotional module 308 may be configured to determine an indication of the emotional state of the operator based on the operator data. For example, the emotional module 308 may determine whether the operator is stressed, anxious, happy, content, relaxed, bored, among other emotional states of the operator. For example, when the blood pressure, respiration, and heart rate of the operator are in the lower portion of a normal range and the facial features of the operator reflect a content mood, the emotional module 308 may determine that the operator is content or happy. As another example, when the blood pressure, respiration, and heart rate of the operator are in the higher portion of a normal range and the facial features of the operator reflect a nervous mood, the emotional module 308 may determine that the operator is nervous. In a similar manner the emotional module 308 may determine other emotional states of the operator using the operator data.

The classification module 310 may be configured to classify scenes along a travel route. Alternately or additionally, the classification module 310 may be configured to classify a travel route based on the classification of the scenes along the travel route or based on characterization data of the scenes along the travel route. The classification module 310 may be further configured to tag the scenes and/or the travel route with their classification.

In some implementations, the classification module 310 may estimate an operator's attitude toward a travel route based on the emotional states of the operator for each of the scenes in the travel route. Based on the operator's attitude and the travel route data, the classification module 310 may classify a travel route.

In some implementations, the classification module 310 may classify scenes along a travel route by correlating, in time, the travel route data with an attitude of the operator toward the scene as estimated by the emotional state of the operator. The travel route data may include a type of a scene and information concerning the scene, such as a temperature, weather of the scene, and other information about the scene as compiled and/or generated by the scene capture module 304. For example, when the travel route data indicates a snowy mountainous scene and the emotional state of the user is anxious, the classification module 310 may estimate that the operator's attitude toward the scene is that it is risky. As a result, the classification module 310 may classify the scene as a dangerous mountainous scene.

Using the classification of one or more scenes along the travel route, the classification module 310 may be configured to classify the travel route. For example, assume that a travel route included five different scenes. One of the scenes indicated a beachfront view and the other four scenes indicated a city view. In these and other implementations, the travel route may be classified and tagged as a city travel route. Alternately or additionally, the travel route may be classified as a city travel route with a beachfront portion. In some implementations, the travel route may be tagged as a city travel route with a beachfront portion and the scene of the travel route that is a beachfront portion and the scenes of the travel route with the city view portions may be indicated in the tag. After classifying the travel routes, the classification module 310 may tag the travel routes with their classification.

Figure 4:
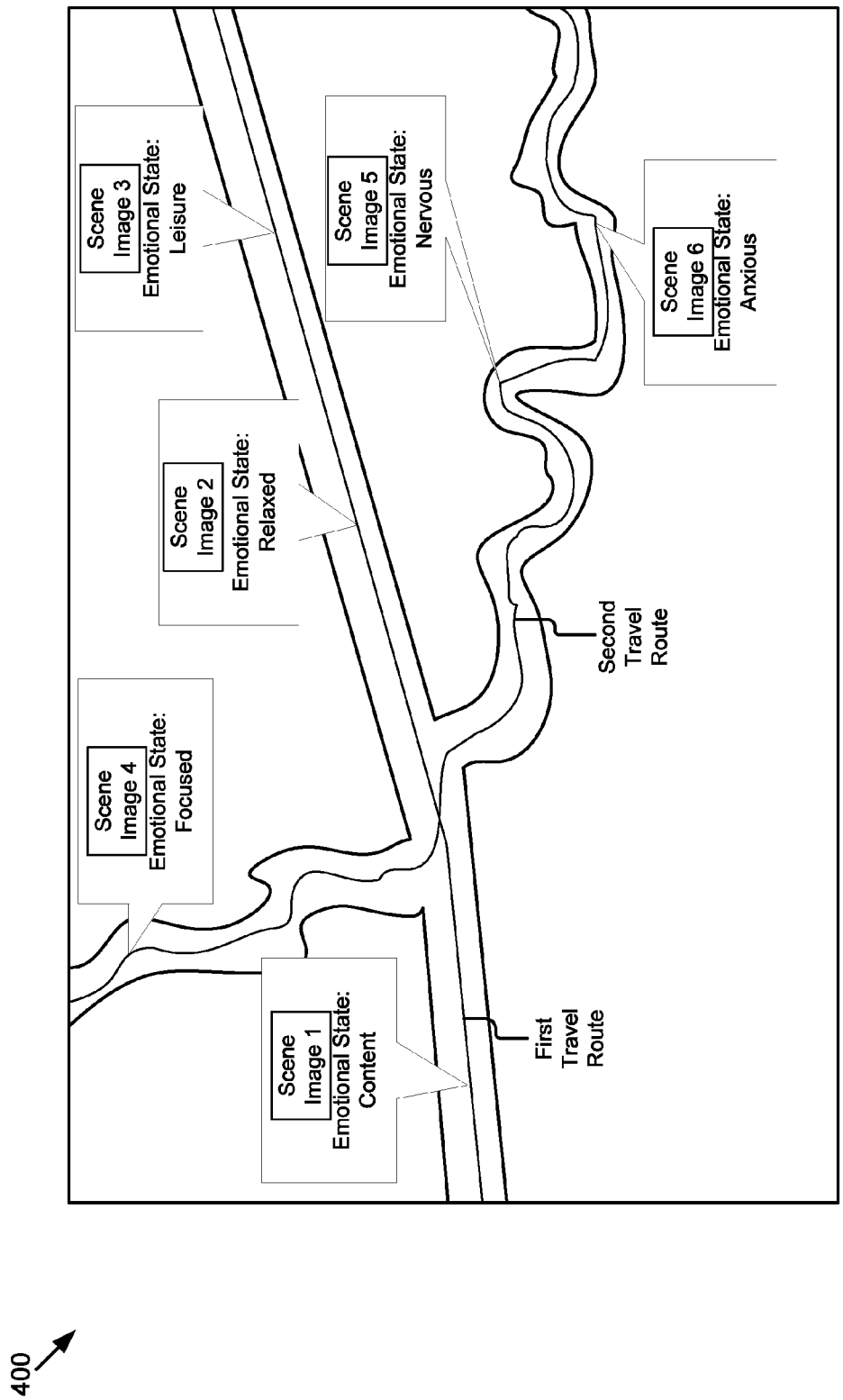
FIG. 4 depicts an example map with first and second travel routes and captured scenes along the first and second travel routes.

By way of example, FIG. 4 depicts example map 400 with first and second travel routes and captured scenes along the first and second travel routes. The first travel route may include first, second, and third scenes. FIG. 4 depicts images of the first, second, and third scenes. FIG. 4 also depicts an operator's emotions that correlate in time to when the images of the first, second, and third scenes are captured. The operator's emotions may be content, relaxed, and relaxed when the first, second, and third images are captured, respectively. As a result, based on the images and the operator's emotions, the first travel route may be classified as a pleasant route.

The second travel route may include fourth, fifth, and sixth scenes. FIG. 4 depicts images of the fourth, fifth, and sixth. FIG. 4 also depicts an operator's emotions that correlate in time to when the images of the fourth, fifth, and sixth are captured. The operator's emotions may be focused, nervous, and anxious when the fourth, fifth, and sixth images are captured, respectively. As a result, based on the images and the operator's emotions, the first travel route may be classified as a dangerous route. The map 400 is merely an example and is not limiting in anyway.

Returning to the discussion of FIG. 3, in some implementations, the classification module 310 may request through the user interface module 312 that the operator confirm the classification of the scene and/or travel route. Alternately or additionally, the classification module 310 may request through the user interface module 312 that the operator of the vehicle confirm the emotional state of the operator or the attitude of the operator.

In some implementations, the classification module 310 may provide the tagged travel route to a social media network such that the tagged travel route may be shared with a social graph of the operator in the social media network.

The user interface module 312 may include software that includes routines for generating graphical data for providing user interfaces. In some implementations, the user interface module 312 generates graphical data for providing a user interface that allows a user (e.g., the first user 125a) to input data via the user interface. For example, the user may respond to requests concerning validating travel route classifications via the user interface. The user interface module 312 may also be configured to send the graphical data to a display coupled to the computing device 300 for presenting the user interface to the user. In some implementations, the user interface module 312 may generate graphical data or audio data for providing notifications to the user. For example, in some implementations, the user interface module 312 may generate a graphical and/or audio notification of a problematic location.

In some implementations, the modules of the route tagging system 191 may be stored in a single server or device. In some other implementations, the modules of the route tagging system 191 may be distributed and stored across multiple servers or devices. Furthermore, the separation of various components, modules, and servers in the implementations described herein should not be understood as requiring such separation in all implementations. In some implementations, the described components, modules, devices, or servers may generally be integrated together in a single component, module, device, or server.

In some implementations, the modules of the route tagging system 191 may be a set of instructions that may be executable by the processor 325. In these or other implementations, one or more of the modules of the route tagging system 191 may be stored in the memory 327 and may be accessible and executable by the processor 325 of the computing device 300. One or more of the modules of the route tagging system 191 may be adapted for cooperation and communication with the processor 325 and other components of the computing device 300. In some implementations, one or more of the modules of the route tagging system 191 may be adapted to function as one or more thin clients that are stored and executed by a processor of the computing device 300.

Example Route Aggregation System

Figure 5:
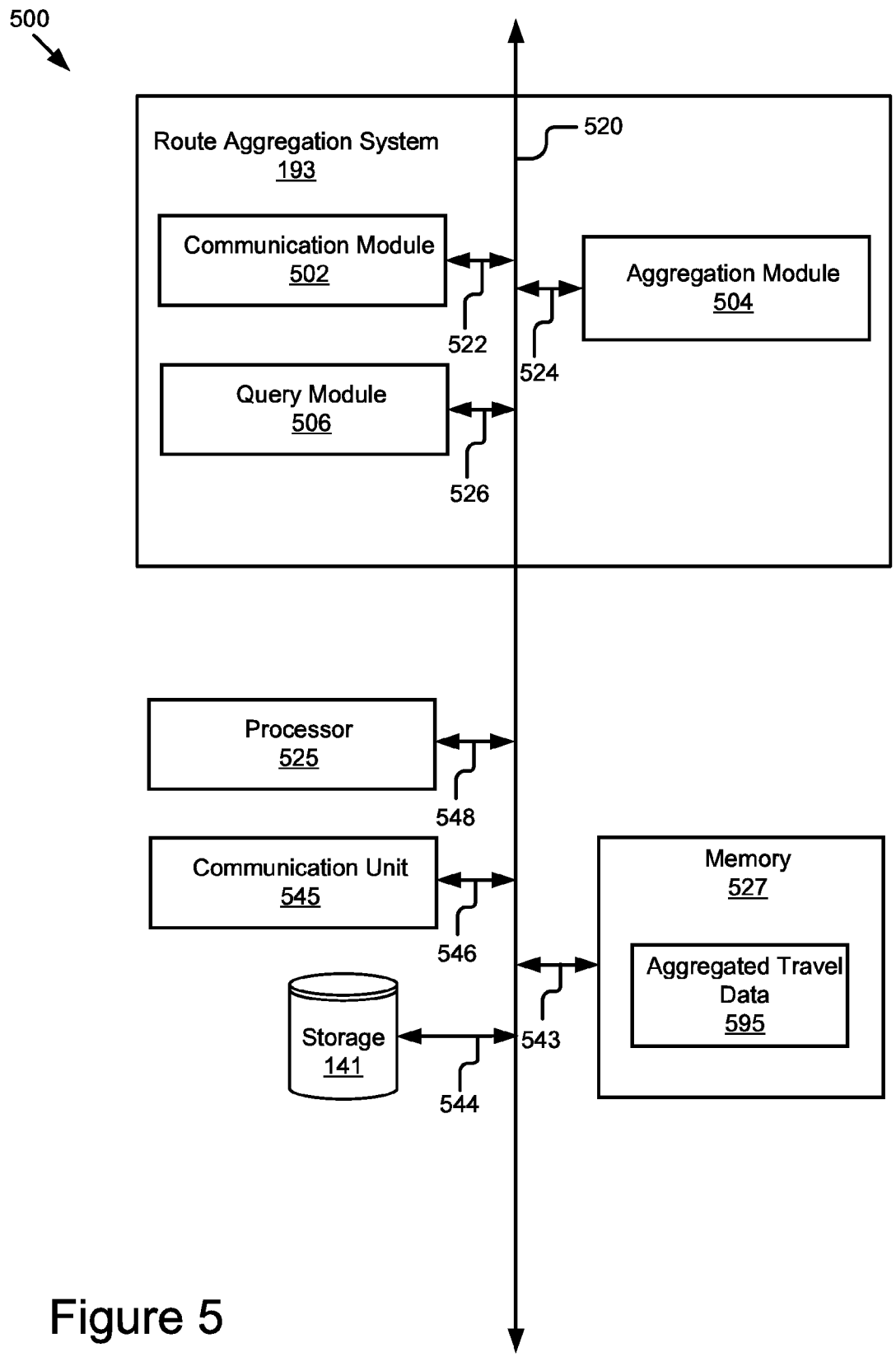
FIG. 5 is a block diagram illustrating an example computing device that includes an example route aggregation system.

FIG. 5 is a block diagram illustrating an example computing device 500 that includes an implementation of the route aggregation system 193 of FIG. 1. As illustrated in FIG. 1, in some implementations, the computing device 500 may be included with the route server 113 of FIG. 1. The computing device 500 includes the route aggregation system 193, a processor 525, a communication unit 545, the storage 141, and a memory 527 according to some examples. The components of the computing device 500 may be communicatively coupled by a bus 520.

The processor 525 may have a structure similar to the processors 225 and 325 and may provide functionality similar to the processors 225 and 325. The processor 525 may be coupled to the bus 520 for communication with other components via a signal line 548. The communication unit 545 may have a structure similar to the communication units 245 and 345 and may provide functionality similar to the communication units 245 and 345. The communication unit 545 may be coupled to the bus 520 for communication with other components via a signal line 546. The storage 141 is described above with respect to FIG. 1 and may be coupled to the bus 520 for communication with other components via a signal line 544.

The memory 527 may have a structure similar to the memories 227 and 327 and may provide functionality similar to the memories 227 and 327. The memory 527 may be coupled to the bus 520 for communication with other components via a signal line 543. The memory 527 may include the time synchronicity data 297 described with respect to FIGS. 2 and 3. Additionally, the memory 527 may include aggregated travel data 595.

The aggregated travel data 595 may include tagged travel routes from route tagging systems. For each of the tagged travel routes, the aggregated travel data 595 may include data about the tagged travel routes. For example, the information for each tagged travel route may include one or more scene along the tagged travel routes. Each of the scenes may include travel route data and operator data associated with the scenes. The travel route data may include a time that an image of the scene is captured and the weather when the image is captured, among of data as described herein.

In the illustrated implementation of FIG. 5, the route aggregation system 193 includes a communication module 502, the aggregation module 504, and a query module 506. The components of the route aggregation system 193 may be communicatively coupled to the bus 520. For example, the communication module 502 may be communicatively coupled to the bus 520 via a signal line 522, the aggregation module 504 may be communicatively coupled to the bus 520 via a signal line 524, and the query module 506 may be communicatively coupled to the bus 520 via a signal line 526.

The communication module 502 may include software including routines for handling communications between the route aggregation system 193 and other components of the computing device 500. The communication module 502 may also be configured to send and receive data, via the communication unit 545, to and from one or more entities of the system 100 of FIG. 1. In some implementations, the communication module 502 receives data from one or more of the modules of the route aggregation system 193 and stores the data in one or more of the storage 141 and the memory 527. In these or other implementations, the communication module 502 may be configured to retrieve data from the storage 141 or the memory 527 and to send the data to one or more of the modules of the route aggregation system 193.

The aggregation module 504 may include software including routines for aggregating travel routes from multiple different route tagging systems 191. In some implementations, the aggregation module 504 may aggregate travel routes based on the travel routes including similar or the same starting and destination locations. Alternately or additionally, the aggregation module 504 may aggregate travel routes based on the travel routes including similar or the same starting and destination locations and the travel routes being similarly classified. In these and other implementations, the aggregation module 504 may aggregate travel routes with similar weather conditions, start and stop times, scenes, or some other criteria.

In some implementations, the aggregation module 504 may classify similar travel routes based on the majority of the classifications for the travel routes received by the route aggregation system 193. For example, when three out of five route tagging systems 191 classify a travel route as risky beachfront and the other route tagging systems 191 classify the travel route as moderate beachfront route, the aggregation module 504 may classify the travel route as a risky beachfront route.

In some implementations, the aggregation module 504 may reconcile different classifications of a travel route from different route tagging system 191 by classifying the travel route with different classifications based on information about the travel route. For example, a travel route may be classified as dangerous by one route tagging system when there is snow and may be classified by another route tagging system as a relaxing when there is sun. In these and other implementations, the aggregation module 504 may further classify the travel route based on the weather. Thus, the travel route when there is sun may be a relaxed travel route but when there is snow it may be a dangerous travel route.

In some implementations, the aggregation module 504 may be configured to classify a travel route based on scenes from multiple other travel routes. For example, the aggregation module 504 may aggregate multiple classified scenes along a travel route from multiple different route tagging systems 191. The aggregation module 504 may classify the travel route based on the multiple classified scenes. In these and other implementations, the new classification for the travel route may be different from the classifications provided by the different route tagging systems 191.

The query module 506 may include software including routines for recommending travel routes to a client device. For example, the query module 506 may be configured to receive a request for a desired travel route with a desired classification through the communication module 502. The request may include route details, including starting and destination locations, current weather data, a range of distances and times desired by the user, a classification of a desired travel route between the starting and destination locations, and characteristics of the classification of the desired travel route, e.g., a rating of the travel route, a number of tagged travel routes received before being used as the recommended travel route, etc.

Based on the route details, the query module 506 may determine a tagged travel route that may be similar to the requested travel route and that has the desired classification. The query module 506 may recommend the determined travel route to the client device. For example, when the route details indicate that it is night and that the weather data indicates that there is snow along the travel route, the query module 506 may select a tagged travel route that occurred at night when it was snowing and that had the desired classification. Alternately or additionally, the query module 506 may recommend multiple travel routes to the client device that may satisfy the desired classification.

In some implementations, the query module 506 may generate a travel route based on the tagged travel routes. In particular, the query module 506 may generate a travel route based on classified scenes from the tagged travel routes. For example, the query module 506 may select scenes that include the desired classification and that are along the desired travel route. The query module 506 may combine the locations of the selected scenes from different travel routes to generate the recommended travel route.

In some implementations, the query module 506 may receive multiple travel routes from a client device and a desired classification for the recommended travel route. In these and other implementations, the query module 506 may recommend one of the multiple travel routes based on which of the multiple travel routes may be most similar to a tagged travel route with the desired classification.

In some implementations, the modules of the route aggregation system 193 may be stored in a single server or device. In some other implementations, the modules of the route aggregation system 193 may be distributed and stored across multiple servers or devices. Furthermore, the separation of various components, modules, and servers in the implementations described herein should not be understood as requiring such separation in all implementations. In some implementations, the described components, modules, devices, or servers may generally be integrated together in a single component, module, device, or server.

In some implementations, the modules of the route aggregation system 193 may be a set of instructions that may be executable by the processor 525. In these or other implementations, one or more of the modules of the route aggregation system 193 may be stored in the memory 527 and may be accessible and executable by the processor 525 of the computing device 500. One or more of the modules of the route aggregation system 193 may be adapted for cooperation and communication with the processor 525 and other components of the computing device 500. In some implementations, one or more of the modules of the route aggregation system 193 may be adapted to function as one or more thin clients that are stored and executed by a processor of the computing device 500.

Methods

In some implementations, one or more steps of the methods 600, 700, 800 may be executed by a processor configured to execute or control execution of the one or more steps of the methods 600, 700, 800. For example, one or more steps of the methods 600, 700, 800 may be executed by the processor 225 or the processor 325. In some implementations, the system 200 may include a special-purpose processor based computing device configured to perform one or more steps of the methods 600, 700, 800. In some implementations, the system 300 may include a special-purpose processor based computing device configured to perform one or more steps of the methods 600, 700, 800.

Figure 6A:
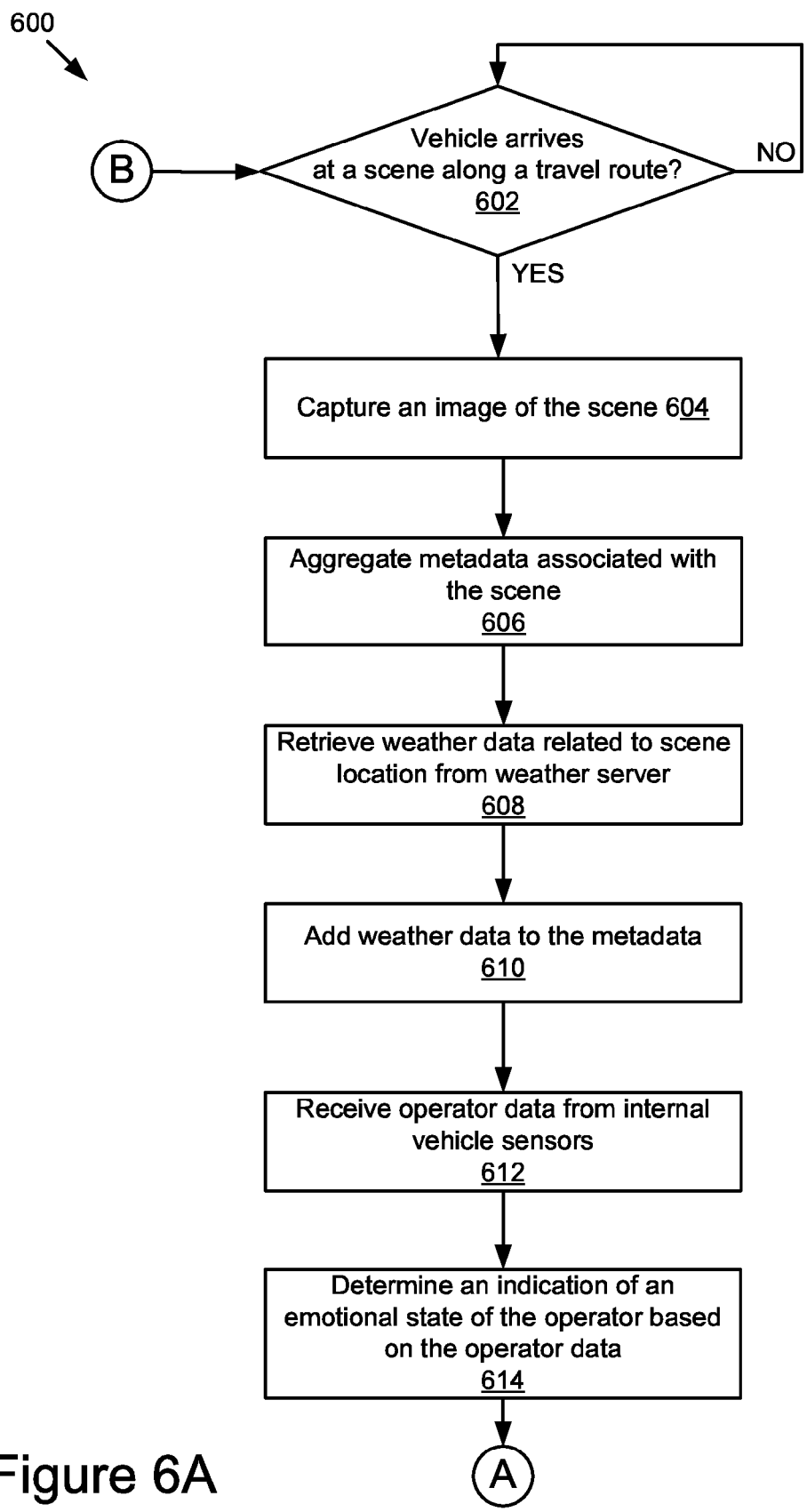
FIGS. 6A and 6B are a flowchart of an example method to classify a travel route.
Figure 6B:
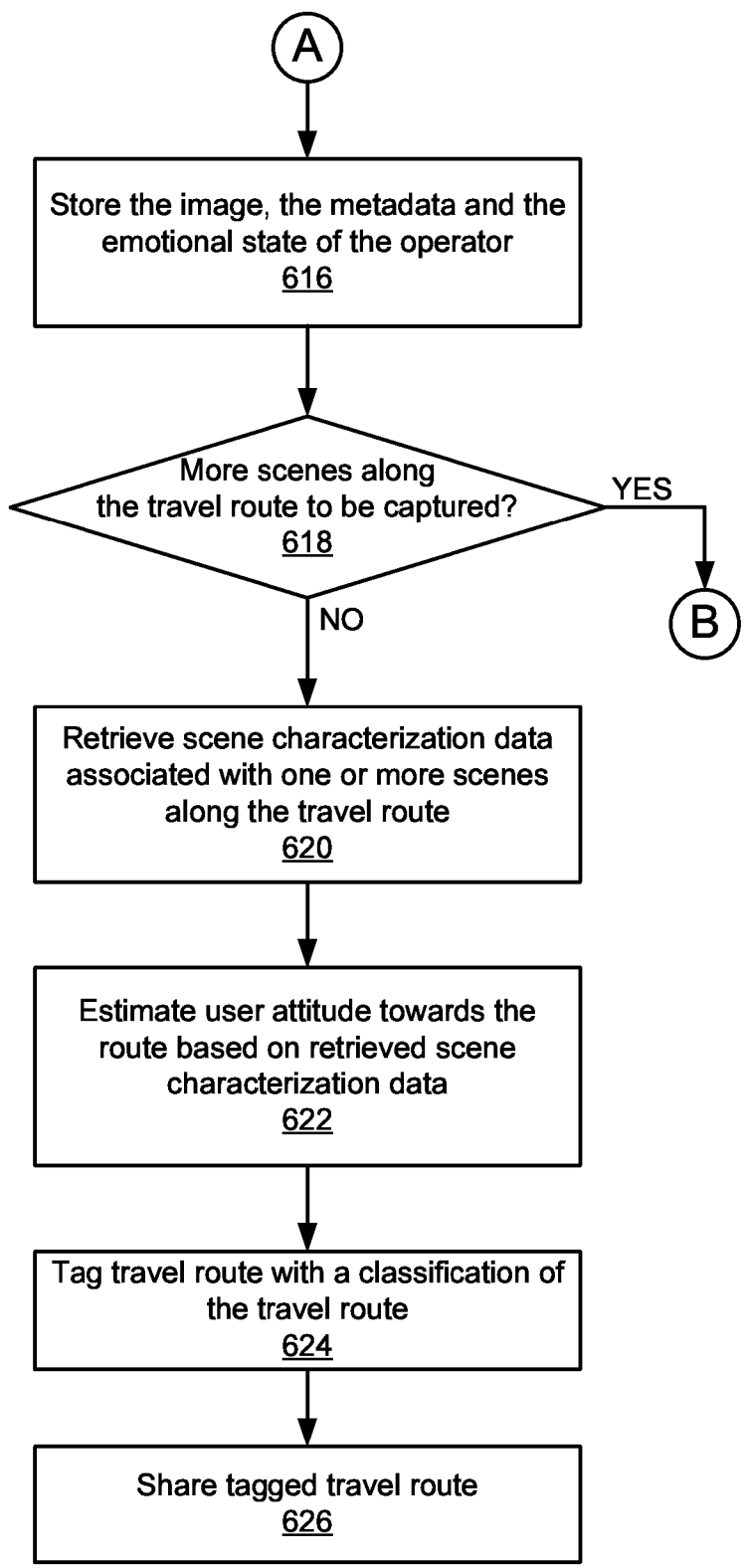

FIGS. 6A and 6B are a flowchart of an example method 600 to classify a travel route. The method 600 may be implemented, in whole or in part, by the route tagging system 191 of FIGS. 1 and 3, or another suitable device or system. For this and other processes and methods disclosed herein, the operations performed in the processes and methods may be implemented in differing order. Furthermore, the outlined operations are only provided as examples, and some of the operations may be optional, combined into fewer operations, supplemented with other operations, or expanded into additional operations without detracting from the essence of the disclosed implementations.

Referring now to FIG. 6A, in some implementations the method 600 includes determining 602 that a vehicle arrives at a scene along a travel route. A scene may be any point along a travel route. The travel route may be any route between a starting location and a destination location.

When the vehicle has arrived at a scene along the travel route, the method 600 may also include capturing 604 an image of the scene. The image of the scene may be captured by a sensor on the vehicle. In some implementations, the sensor may be a camera.

The method 600 may also include aggregating 606 metadata associated with the scene. The metadata may be captured by one or more sensors associated with the vehicle. The metadata may include data that may describe a scene location, weather conditions at the scene, location of the scene, a time the scene image is captured, a driving speed of the vehicle, a temperature at the scene, a sensor type used to capture the image of the scene, a lens type used to capture the image of the scene, among other types of metadata.

The method 600 may also include retrieving 608 weather data related to scene location from a weather server. The method 600 may also include adding 610 the weather data to the metadata.

The method 600 may also include receiving 612 operator data from sensors internal to the vehicle. The operator data may include data about an operator of the vehicle. The operator data may include an image of the operator and/or biological metrics of the operator. In some implementations, the image of the operator may be an image of the face of the operator. In some implementations, the biological metrics of the operator may include the respiration, the blood pressure, the temperature, and/or the heart rate of the operator, among other biological metrics of the operator.

The method 600 may also include determining 614 an indication of the emotional state of the operator based on the operator data.

Referring now to FIG. 6B, the method 600 may also include storing 616 the image, the metadata, and the emotional state of the operator as scene characterization data.

The method 600 may also include determining 618 whether there are more scenes to be captured along the travel route. It may be determined if there are more scenes to be captured based on a distance and/or time to the destination location. Alternately or additionally, it may be determined if there are more scenes to be captured based on a change in a scene along the travel route. When there are more scenes to be captured along the travel route, the method 600 may proceed to determining 602 that the vehicle arrives at a new scene along the travel route.

When there are not more scenes to be captured along the travel route, the method 600 may also include retrieving scene characterization data associated with one or more scenes along the travel route.

The method 600 may also include estimating 622 an operator attitude towards the travel route based on the retrieved scene characterization data. The method 600 may also include tagging 624 the travel route with a classification of the travel route based on the operator attitude and retrieved scene characterization data.

The method 600 may also include sharing 626 the tagged travel route. The tagged travel route may be shared with social media network associated with the operator. Alternately or additionally, the tagged travel route may be shared with a route aggregation system. The route aggregation system may recommend the travel route to operators of other vehicles based on requests from the operator of the other vehicles.

Although not illustrated in FIG. 6A or 6B, the method 600 may include one or more other steps or operations. For example, the method 600 may include correlating, in time, the emotion state of the user with the image of the scene and the metadata associated with the image of the scene. In these or other implementations, the correlation may be based on time synchronicity data.

Some implementations disclosed herein include a computer program product including a non-transitory computer-usable medium that includes a computer-readable program. Execution of the computer-readable program on a computer may cause the computer to perform or may cause the computer to control performance of the method 600 and/or variations thereof. The non-transitory computer-usable medium may include, for example, the storage 141 of FIGS. 1 and 5, the storage 241 of FIG. 2, the memory 227 of FIG. 2, the storage 341 of FIG. 3, the memory 327 of FIG. 3, and/or the memory 527 of FIG. 5. The computer-readable program may include, for example, the route tagging system 191 of FIGS. 1 and 3. The computer may include, for example, the computing devices 200, 300, or 500 of FIGS. 2, 3, and 5.

Figure 7:
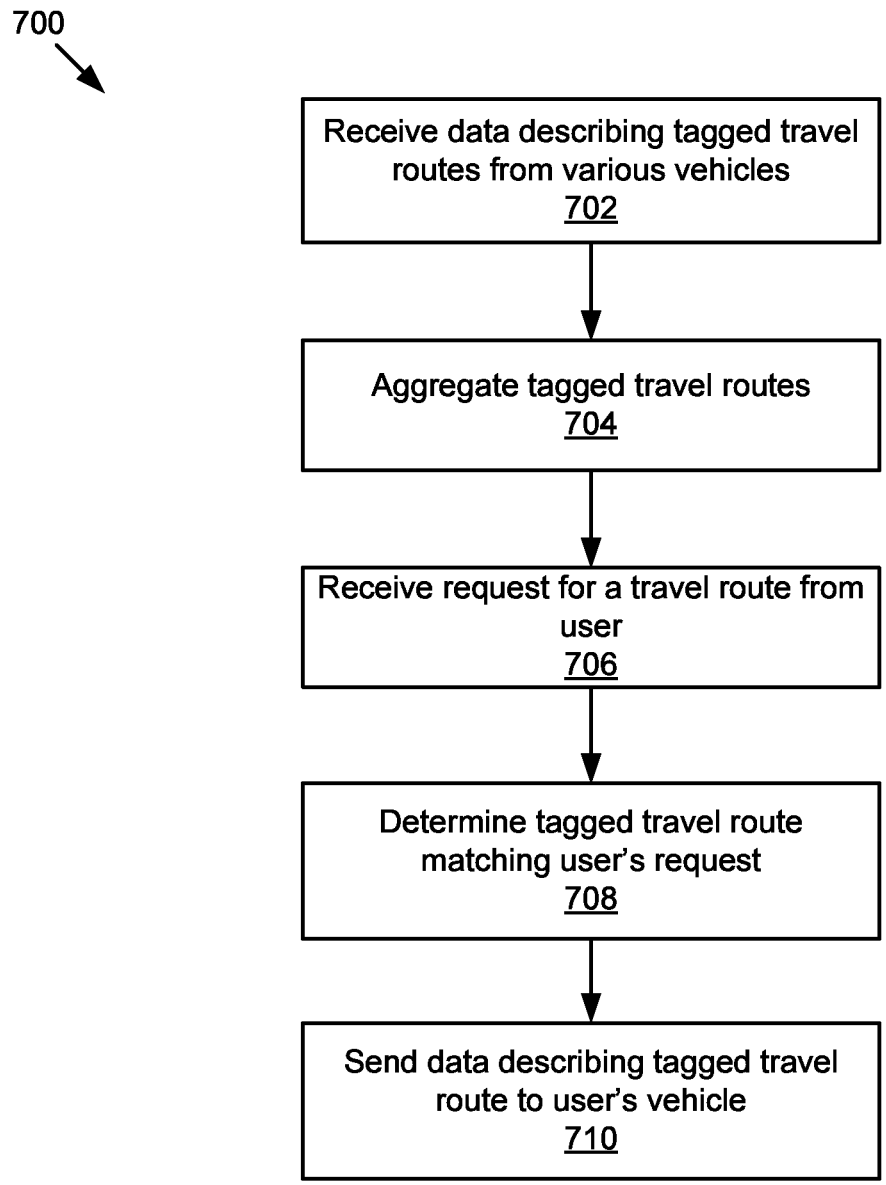
FIG. 7 is a flowchart of an example method to classify a travel route.

FIG. 7 is a flowchart of an example method 700 to classify a travel route. The method 700 may be implemented, in whole or in part, by the route server 113 of FIG. 1 and/or the computing device 500 of FIG. 5, or another suitable device or system. For this and other processes and methods disclosed herein, the operations performed in the processes and methods may be implemented in differing order. Furthermore, the outlined operations are only provided as examples, and some of the operations may be optional, combined into fewer operations, supplemented with other operations, or expanded into additional operations without detracting from the essence of the disclosed implementations.

In some implementations, the method 700 includes receiving 702 data that describes tagged travel routes from various client devices. The method 700 also includes aggregating 704 the tagged travel routes. The method 700 may also include receiving 706 a request for a travel route from a user. The method 700 may also include determining 708, a tagged travel route that matches the user's request. The method 700 may also include sending 710 data describing the tagged travel route to the user's vehicle.

Some implementations disclosed herein include a computer program product including a non-transitory computer-usable medium that includes a computer-readable program. Execution of the computer-readable program on a computer may cause the computer to perform or may cause the computer to control performance of the method 700 and/or variations thereof. The non-transitory computer-usable medium may include, for example, the storage 141 of FIGS. 1 and 5, the storage 241 of FIG. 2, the memory 227 of FIG. 2, the storage 341 of FIG. 3, the memory 327 of FIG. 3, and/or the memory 527 of FIG. 5. The computer-readable program may include, for example, the route server 113 of FIG. 1 and/or the computing device 500 of FIG. 5. The computer may include, for example, the computing devices 200, 300, or 500 of FIGS. 2, 3, and 5.

Figure 8:
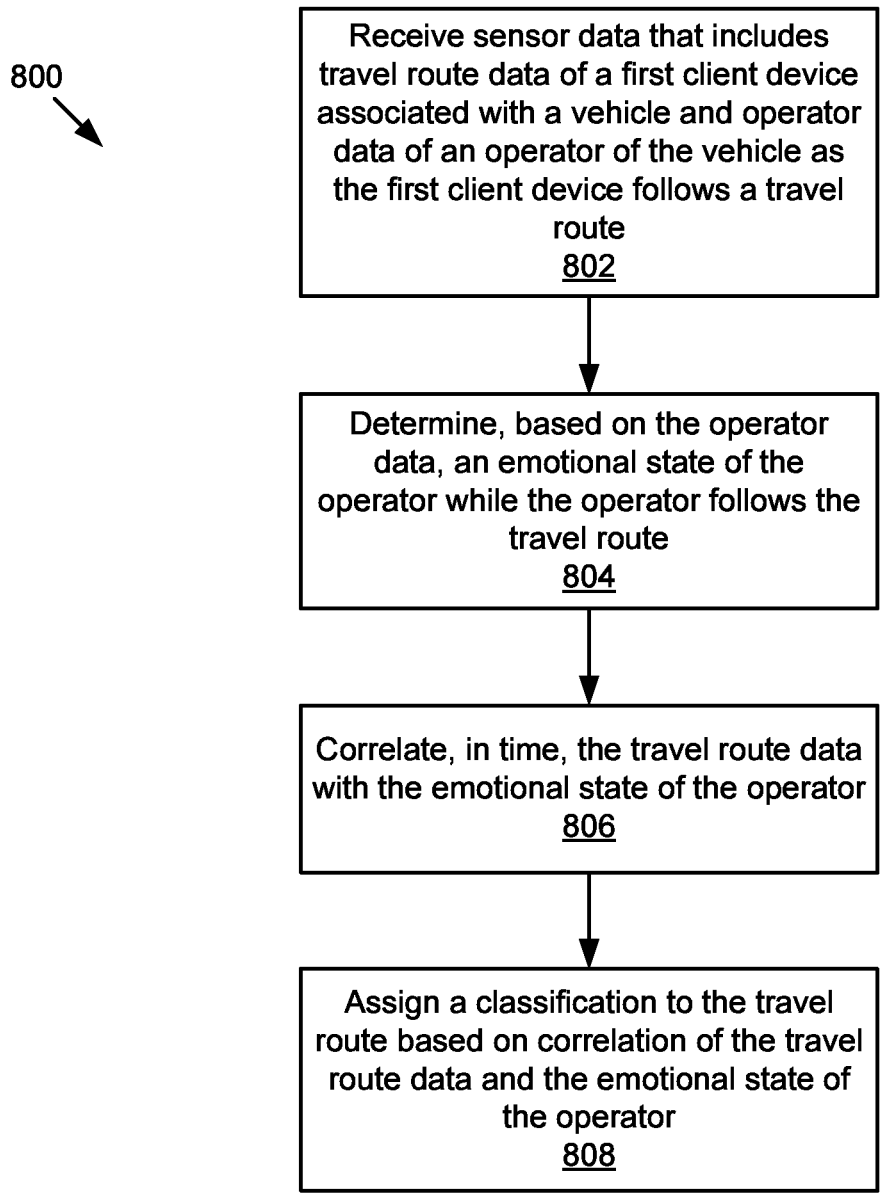
FIG. 8 is a flowchart of an example method to classify a travel route.

FIG. 8 is a flowchart of an example method 800 to determine a problematic hotspot. The method 800 may be implemented, in whole or in part, by the route tagging system 191 of FIGS. 1 and 3, the route server 113 or another suitable device or system. For this and other processes and methods disclosed herein, the operations performed in the processes and methods may be implemented in differing order. Furthermore, the outlined operations are only provided as examples, and some of the operations may be optional, combined into fewer operations, supplemented with other operations, or expanded into additional operations without detracting from the essence of the disclosed implementations.

In some implementations, the method 800 includes receiving 802 sensor data that includes travel route data of a first client device associated with a vehicle and operator data of an operator of the vehicle as the first client device follows a travel route.

The method 800 also includes determining 804, based on the operator data, an emotional state of the operator while the operator follows the travel route. The method 800 also includes correlating 806, in time, the travel route data with the emotional state of the operator. The method 800 also includes assigning 808 a classification to the travel route based on correlation of the travel route data and the emotional state of the operator.

Although not illustrated in FIG. 8, the method 800 may include one or more other steps or operations. For example, the method 800 may include any one or more of the steps and operations described with respect to the methods 600 and 700 of FIGS. 6 and 7, respectively. For example, the method 800 may include recommending the travel route to a second client device based on a request from the second client device for a desired travel route with the classification.

Some implementations disclosed herein include a computer program product including a non-transitory computer-usable medium that includes a computer-readable program. Execution of the computer-readable program on a computer may cause the computer to perform or may cause the computer to control performance of the method 800 and/or variations thereof. The non-transitory computer-usable medium may include, for example, the storage 141 of FIGS. 1 and 5, the storage 241 of FIG. 2, the memory 227 of FIG. 2, the storage 341 of FIG. 3, the memory 327 of FIG. 3, and/or the memory 527 of FIG. 5. The computer-readable program may include, for example, the route tagging system 191 of FIGS. 1 and 3. The computer may include, for example, the computing devices 200, 300, or 500 of FIGS. 2, 3, and 5.

In the above description, for purposes of explanation, numerous specific details are set forth in order to provide a thorough understanding of the specification. It will be apparent, however, to one skilled in the art that the disclosure may be practiced without these specific details. In some instances, structures and devices are shown in block diagram form in order to avoid obscuring the description. For example, the present implementations may be described above primarily with reference to user interfaces and particular hardware. However, the present implementations may apply to any type of computing device that may receive data and commands, and any peripheral devices providing services.

Reference in the specification to "some implementations" or "some instances" means that a particular feature, structure, or characteristic described in connection with the implementations or instances may be included in at least one implementation of the description. The appearances of the phrase "in some implementations" in various places in the specification are not necessarily all referring to the same implementations.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present implementations of the specification may also relate to an apparatus for performing the operations herein. This apparatus may be specially constructed for the required purposes, or it may include a special-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification may take the form of some entirely hardware implementations, some entirely software implementations or some implementations containing both hardware and software elements. In some preferred implementations, the specification is implemented in software, which includes, but is not limited to, firmware, resident software, microcode, etc.

Furthermore, the description may take the form of a computer program product accessible from a computer-usable or computer-readable medium providing program code for use by or in connection with a computer or any instruction execution system. For the purposes of this description, a computer-usable or computer-readable medium may be any apparatus that may contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or signifimayt, and the mechanisms that implement the specification or its features may have different names, divisions, or formats. Furthermore, as will be apparent to one of ordinary skill in the relevant art, the modules, routines, features, attributes, methodologies, and other aspects of the disclosure may be implemented as software, hardware, firmware, or any combination of the three. Also, wherever a component, an example of which is a module, of the specification is implemented as software, the component may be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method, comprising:
   estimating an attitude of an operator of a first client device towards a travel route based on data collected by the first client device while the first client device was following the travel route and operated by the operator, wherein the travel route includes a plurality of scenes and the data describes one or more emotional states of the operator while the first client device and the operator were present at the plurality of scenes such that each of the one or more emotional states are responsive to at least one of the scenes included in the plurality of scenes;

assigning, by a processor, a classification to the travel route based on the attitude of the operator towards the travel route, wherein the classification describes the travel route consistent with the one or more emotional states of the operator responsive to the at least one of the scenes included in the plurality of scenes;

generating a map that includes a plurality of travel routes and their assigned classifications, wherein the plurality of travel routes includes the travel route followed by the first client device and its assigned classification and the map visually depicts the plurality of scenes and the one or more emotional states of the operator while the first client device and the operator were present at the plurality of scenes; and recommending the travel route to a second client device based on a request from the second client device for a desired travel route with the classification, wherein recommending the travel route includes selecting the travel route from the map based on the classification wherein the second client device is an onboard computer of a vehicle that is configured to provide the recommended travel route to an operator of the vehicle.

2. The method of claim 1, further comprising verifying the one or more emotional states based on user data from a user interface of the first client device.

3. The method of claim 1, wherein the data includes sensor data collected by one or more sensors of a second vehicle which is communicatively coupled to the first client device.

4. The method of claim 1, wherein the first client device is a first onboard computer of a first vehicle and the second client device is a second onboard computer of a second vehicle.

5. The method of claim 1, wherein the estimation of the emotional state of the operator is based on one or more of an image of the operator and a biological metric of the operator.

6. The method of claim 1, wherein the data further includes images of the plurality of scenes along the travel route followed by the first client device.

7. The method of claim 6, wherein the images are captured by one or more sensors of a second vehicle with which the first client device is associated, wherein the second vehicle is different than the first client device.

8. The method of claim 6, wherein the images are retrieved from one or more social media collections associated with the first client device.

9. The method of claim 6, wherein the map includes the images of the plurality of scenes.

10. The method of claim 1, further comprising:
receiving time synchronicity data associated with when the first client device followed the travel route; and
receiving weather data about the travel route that corresponds to the time synchronicity data, wherein the travel route followed by the first client device is classified based on the weather data.

11. A system comprising:
one or more processors; and
a memory communicatively coupled to the one or more processors, the memory storing instructions that when executed cause the system to:
assign a classification to a travel route followed by a first client device based on data associated with when the first client device followed the travel route while operated by an operator, wherein the travel route includes a plurality of scenes, the data describes an emotional reaction of the operator to the plurality of scenes and the classification describes the travel route based on the emotional reaction;
generate a map that includes a plurality of travel routes and their assigned classifications as aggregated from a plurality of client devices, wherein the plurality includes the travel route followed by the first client device and its assigned classification and the map visually depicts the plurality of scenes and the emotional reaction; and
recommend the travel route followed by a first client device to a second client device based on a request from the second client device for a desired travel route with the classification, wherein recommending the travel route includes selecting the travel route from the map based on the classification wherein the second client device is an onboard computer of a vehicle that is configured to provide the recommended travel route to an operator of the vehicle.

12. The system of claim 11, wherein the instructions further cause the system to verify the classification of the travel route based on user data from a user interface.

13. The system of claim 11, wherein the data is based on one or more sensors of a second vehicle of which the first client device is associated, wherein the second vehicle is different than the first client device.

14. The system of claim 11, wherein the data includes sensor data collected by one or more sensors of a second vehicle with which the first client device is associated, wherein the second vehicle is different than the first client device.

15. The system of claim 11 wherein the data includes an indication of an emotional state of the operator.

16. The system of claim 15, wherein the indication of the emotional state of the operator is based on one or more of an image of the operator and a biological metric of the operator.

17. The system of claim 11, wherein the data includes images of scenes along the travel route followed by the first client device.

18. The system of claim 17, wherein the images are captured by one or more sensors of a vehicle with which the first client device is associated.

19. The system of claim 17, wherein the images are retrieved from one or more social media collections associated with the first client device.

20. The system of claim 18, wherein the instructions further cause the system to:
receive time synchronicity data associated with when the first client device followed the travel route; and
receive weather data about the travel route that corresponds to the time synchronicity data, wherein the travel route followed by the first client device is classified based on the weather data.

21. The system of claim 11, wherein the instructions further cause the system to provide the map to the second client device.

22. A non-transitory computer-readable medium having computer instructions stored thereon that are executable by a processing device to perform or control performance of operations comprising:
receive sensor data that includes travel route data of a first client device associated with a vehicle and operator data of an operator of the vehicle as the first client device follows a travel route;

determine, based on the operator data, an emotional state of the operator while the operator follows the travel route;

correlate the travel route data with the emotional state of the operator;

assign a classification to the travel route based on correlation of the travel route data and the emotional state of the operator; and generating a map that includes a plurality of travel routes and their assigned classifications, wherein the plurality of travel routes includes the travel route followed by the first client device and its assigned classification and the map visually depicts a plurality of scenes along the travel route followed by the first client device and the emotional state of the operator responsive to the plurality of scenes.

23. A system, comprising:
a first sensor mounted in a vehicle to record operator data describing an emotional state of an operator of the vehicle;
a second sensor mounted in the vehicle to record travel route data describing a scene of a travel route followed by the vehicle;
a non-transitory memory communicatively coupled to the first and second sensors, the memory storing instructions that when executed by a processor cause the processor to: assign a classification to the route based on the operator data and the travel route data; and generate a map that includes a plurality of travel routes and their assigned classifications, wherein the plurality of travel routes includes the travel route followed by the vehicle and its assigned classification and the map visually depicts a plurality of scenes along the travel route followed by the vehicle and the emotional state of the operator responsive to the plurality of scenes.

24. The system of claim 23, wherein the instructions further cause the system to determine the emotional state of the operator based on the operator data.

25. The system of claim 24, wherein the instructions further cause the system to correlate, in time, the travel route data with the emotional state of the operator, wherein the classification of the travel route is based on the correlation of the travel route data and the emotional state of the operator.

26. The system of claim 23, further comprising a communication unit communicatively coupled with the memory, wherein the instructions further cause the communication unit to transmit the travel route and the classification of the travel route to a network.

27. The system of claim 26, wherein the instructions further cause the communication unit to receive a second travel route of a requested classification.

28. A method for tagging a travel route of a first vehicle, the method comprising:
capturing one or more scenes along the travel route of the first vehicle:
determining that there are not additional scenes to be captured along the travel route of the first vehicle;
retrieving a set of scene characterization data associated with the one or more scenes along the travel route of the first vehicle, wherein the set of scene characterization data describes emotional states of an operator of the first vehicle while traveling in the first vehicle and present at each of the one or more scenes, wherein the emotional states are a response of the operator to the one or more scenes;
estimating an attitude of an operator of the first vehicle toward the travel route of the first vehicle based on the set of scene characterization data, wherein the attitude of the operator of the first vehicle toward the travel route is consistent with the response of the operator to the one or more scenes included in the travel route;
tagging the travel route of the first vehicle based on the estimated attitude toward the travel route, wherein the tag for the travel route includes tag data that indicates the attitude of the operator toward the travel route; and
sharing the tag for the travel route with a second vehicle;
wherein capturing the one or more scenes comprises:
determining, by a processor of the first vehicle, if the first vehicle is at a scene along the travel route;
capturing, by a camera mounted to the first vehicle, an image of the scene;
aggregating metadata associated with the scene;
retrieving, via a wireless network, weather data related to the scene from a weather server that is communicatively coupled to the first vehicle via the wireless network;
adding the weather data to the metadata associated with the scene;
receiving, by the processor of the first vehicle, operational data from one or more internal vehicle sensors that are communicatively coupled to the processor of the first vehicle;
determining an emotional state of the operator of the first vehicle based on the operational data; and
storing scene characterization data that includes an association between the image, the metadata and the emotional state such that the scene characterization data indicates that the emotional state of the operator is only known to be valid for a weather condition described by the weather data included in the metadata.

29. The method of claim 28, further comprising:
receiving, by a cloud server, the tag data from the first vehicle that is communicatively coupled to the cloud server via the wireless network;
aggregating, by the cloud server, the tag data with other tag data for the travel route to form aggregated tag data, wherein the other tag data was received by the cloud server from a plurality of other first vehicles;
determining, by the cloud server, a community attitude toward the travel route based on the aggregated tag data, wherein the community attitude describes a prevailing attitude toward the travel route;
receiving, by the cloud server, a request for a recommended travel route from a second vehicle;
determining, by the cloud server, that the request matches the first travel route;
providing, by the cloud server, recommendation data to the second vehicle, wherein the recommendation data describes the first travel route and the prevailing attitude toward the travel route.

* * * * *